(12) United States Patent
Irimie et al.

(10) Patent No.: US 9,781,160 B1
(45) Date of Patent: Oct. 3, 2017

(54) SYSTEMS AND METHODS FOR DISCOVERING SUSPECT BOT IP ADDRESSES AND USING VALIDATED BOT IP ADDRESS TO IGNORE ACTIONS IN A SIMULATED PHISHING ENVIRONMENT

(71) Applicant: KnowBe4, Inc., Clearwater, FL (US)

(72) Inventors: Alin Irimie, Clearwater, FL (US); Greg Kras, Dunedin, FL (US)

(73) Assignee: KNOWBE4, INC., Clearwater, FL (US)

( * ) Notice: Subject to any disclaimer, the term of this patent is extended or adjusted under 35 U.S.C. 154(b) by 0 days.

(21) Appl. No.: 15/610,513

(22) Filed: May 31, 2017

(51) Int. Cl.
*H04L 29/06* (2006.01)

(52) U.S. Cl.
CPC ...... *H04L 63/1483* (2013.01); *H04L 63/1416* (2013.01); *H04L 63/1433* (2013.01); *H04L 2463/144* (2013.01)

(58) Field of Classification Search
CPC ............. H04L 63/1483; H04L 63/1433; H04L 63/1416; H04L 2463/144
See application file for complete search history.

(56) References Cited

U.S. PATENT DOCUMENTS

| | | | | |
|---|---|---|---|---|
| 7,908,328 B1 * | 3/2011 | Hulten | .................... | H04L 51/12 709/204 |
| 8,056,132 B1 * | 11/2011 | Chang | ................... | G06F 21/552 713/187 |
| 8,601,547 B1 * | 12/2013 | Shen | ..................... | G06F 21/554 713/161 |
| 9,300,683 B2 * | 3/2016 | Rapaport | ............ | H04L 63/1441 |
| 9,628,498 B1 * | 4/2017 | Aziz | ................... | H04L 63/1408 |
| 2006/0068755 A1 * | 3/2006 | Shraim | .................. | H04L 51/12 455/410 |
| 2008/0320095 A1 * | 12/2008 | Pearson | .................. | H04L 51/12 709/207 |
| 2008/0320119 A1 * | 12/2008 | Achan | ............... | H04L 29/12783 709/222 |
| 2010/0095374 A1 * | 4/2010 | Gillum | ................... | G06Q 30/02 726/22 |
| 2010/0312877 A1 * | 12/2010 | Xie | ..................... | H04L 63/1408 709/224 |
| 2013/0297375 A1 * | 11/2013 | Chapman | ........... | G06Q 10/0635 705/7.28 |

\* cited by examiner

*Primary Examiner* — Darren B Schwartz
(74) *Attorney, Agent, or Firm* — Foley & Lardner LLP; Christopher J. McKenna

(57) ABSTRACT

Methods, systems and apparatus are provided which allow a server of a security awareness system to associate IP addresses with events representing user interactions with simulated phishing campaigns. The server receives a plurality of events related to one or more simulated phishing campaigns for a plurality of accounts. The server determines if an IP address of the plurality of IP addresses is associated with one or more events for multiple accounts of the plurality of accounts. Based upon this determination, the server provides identification of the IP address as suspected as having the one or more events associated with it not originating from any user of the multiple accounts. The server receives an indication of whether the IP address is validated as having the one or more events originating from a bot instead of a user of one of the multiple accounts.

18 Claims, 20 Drawing Sheets

300

Receiving a plurality of events of one or more campaigns for a plurality of accounts and a plurality of IP addresses associated with the plurality of events
310

↓

Determining that an IP address of the plurality of IP addresses is associated with one or more events for multiple accounts of the plurality of accounts
320

↓

Providing identification of the IP address as suspected as having the one or more events not originating from any user of the multiple accounts
330

↓

Receiving an indication of whether the IP address is validated as having the one or more events originating from a bot instead of a user of one of the multiple accounts
340

Receiving a plurality of events of one or more campaigns for a plurality of accounts and a plurality of IP addresses associated with the plurality of events
310

↓

Determining that an IP address of the plurality of IP addresses is associated with one or more events for multiple user accounts of the plurality of user accounts
320

↓

Determining a number of occurrences of the IP address across multiple accounts and a number of unique accounts of the plurality of accounts for which the IP address is associated
324

↓

Providing identification of the IP address as suspected as having the one or more events not originating from any user of the multiple user accounts
330

↓

Receiving an indication of whether the IP address is validated as having the one or more events originating from a bot instead of a user of one of the multiple user accounts
340

Receiving a plurality of events of one or more campaigns for a plurality of accounts and a plurality of IP addresses associated with the plurality of events
310

↓

Determining that an IP address of the plurality of IP addresses is associated with one or more events for multiple accounts of the plurality of accounts
320

↓

Providing identification of the IP address as suspected as having the one or more events not originating from any user of the multiple accounts
330

↓

Providing a user interface to display identification of the IP addresses suspected as having the one or more events originating from a user of one of the multiple accounts
332

↓

Receiving an indication of whether the IP address is validated as having the one or more events originating from a bot instead of a user of one of the multiple accounts
340

Receiving a plurality of events of one or more campaigns for a plurality of accounts and a plurality of IP addresses associated with the plurality of events
310

↓

Determining that an IP address of the plurality of IP addresses is associated with one or more events for multiple accounts of the plurality of accounts
320

↓

Providing identification of the IP address as suspected as having the one or more events not originating from any user of the multiple accounts
330

↓

Providing a number of occurrences of the IP address across multiple accounts and a number of unique accounts of the plurality of accounts for which the IP address is associated
334

↓

Receiving an indication of whether the IP address is validated as having the one or more events originating from a bot instead of a user of one of the multiple accounts
340

```
Receiving a plurality of events of one or more campaigns
for a plurality of accounts and a plurality of IP addresses
associated with the plurality of events
310
```
↓
```
Determining that an IP address of the plurality of IP
addresses is associated with one or more events for
multiple accounts of the plurality of accounts
320
```
↓
```
Providing identification of the IP address as suspected as
having the one or more events not originating from any
user of the multiple accounts
330
```
↓
```
Receiving via a user interface an indication of that the IP
address is from a bot instead of a user of one of the
multiple accounts
342
```

Receiving a plurality of events of one or more campaigns for a plurality of accounts and a plurality of IP addresses associated with the plurality of events
310

Determining that an IP address of the plurality of IP addresses is associated with one or more events for multiple accounts of the plurality of accounts
320

Providing identification of the IP address as suspected as having the one or more events not originating from any user of the multiple accounts
330

Receiving an indication of whether the IP address is validated as having the one or more events originating from a bot instead of a user of one of the multiple accounts
340

Receiving specification of a rule identifying whether the IP address is validated as a bot or a user and automatically determining whether the rule overlaps with any other rules
350

| ■ ###.####.####.## – ##.####.####.## | | | | | | | | | |
|---|---|---|---|---|---|---|---|---|---|
| needs review | | | | | | | | | |
| IP | Email | User ID | Created | Clicked | Accessbeacon | Clicked | User Agent | Platform | Browser | OS | + Account |
| ##.###.###.## | person1@company1.ca | 4574511 | 03/22/2017 01:49PM | 03/22/2017 01:51PM | | | | windows | Internet Explorer | windows | Company 1 |
| ##.###.###.## | person1@company2.org | 291983 | 02/21/2017 08:37AM | 02/21/2017 08:37AM | | | | WinXP | IE | WinXP | Company 2 |
| ##.###.###.## | person1@company3.org | 4219916 | 03/10/2017 09:00AM | 03/10/2017 09:00AM | | | | windows | Internet Explorer | windows | Company 3 |
| ##.###.###.## | person2@company3.org | 40098635 | 03/17/2017 08:49AM | 03/17/2017 08:50AM | | | | windows | Internet Explorer | windows | Company 3 |
| ##.###.###.## | person1@company5.com | 40203742 | 03/18/2017 09:05AM | 03/21/2017 08:40AM | | | | windows | Internet Explorer | windows | Company 5 |
| ##.###.###.## | person1@company6.com | 3861974 | 03/28/2017 08:07AM | 03/28/2017 08:07AM | | | | windows | Internet Explorer | windows | Company 6 |
| ##.###.###.## | person1@company7.com | 39619899 | 03/28/2017 08:08AM | 03/28/2017 08:08AM | | | | windows | Internet Explorer | windows | Company 7 |
| ##.###.###.## | person1@company8.com | 3862177 | 03/28/2017 08:07AM | 03/28/2017 08:07AM | | | | windows | Internet Explorer | windows | Company 8 |

SYSTEMS AND METHODS FOR DISCOVERING SUSPECT BOT IP ADDRESSES AND USING VALIDATED BOT IP ADDRESS TO IGNORE ACTIONS IN A SIMULATED PHISHING ENVIRONMENT

FIELD OF THE DISCLOSURE

This disclosure generally relates to systems and methods for automatically discovering IP addresses that may be associated with a bot instead of a human, and providing a user interface to disposition the identified suspect IP addresses and classify them as bot or human. The disclosure further provides systems and methods for updating user event statistics related to simulated phishing campaigns when the user event is associated with an IP address that has been validated as a bot IP address.

BACKGROUND OF THE DISCLOSURE

A phishing attack involves an attempt to acquire sensitive information such as usernames, passwords, credit card details, etc., often for malicious reasons, possibly by masquerading as a trustworthy entity. For example, an email may be sent to a target, the email having an attachment that performs malicious actions when executed or a link to a webpage that either performs malicious actions when accessed or prompts the user to execute a malicious program. Malicious actions may be malicious data collection or actions harmful to the normal functioning of a device on which the email was activated, or any other malicious actions capable of being performed by a program or a set of programs.

It can be useful to perform simulated phishing attacks on a user or a set of users. Simulated phishing attacks allow an organization to determine the level of vulnerability to phishing attacks of a user or set of users. This knowledge can be used by internet technology organizations to reduce this level of vulnerability through tools or training.

In a simulated phishing attack, a security awareness system uses campaigns to send simulated phishing emails to users that are associated with a company account (an account), and the security awareness system receives events associated with users interacting with simulated phishing emails of the campaigns, and receives IP addresses associated with the events. It has become increasingly popular for security appliances or services and software to follow links within an email automatically, prior to the email being presented to a user. For example, some firewalls can now extract HTTP/HTTPS links contained in SMTP and POP3 email messages and forward the links to a security appliance for analysis. The security appliance visits the link to determine if the corresponding web address host any exploits. This automated following of links is also called "robo-clicks". Any non-human security appliance or services or software that follow links automatically is also known as an internet bot, or a web robot, or a www robot, or simply a bot. More generally, a bot is a software application that runs automated tasks (scripts) over the internet. Typically, bots perform tasks that are simple and repetitive. For example, a web crawler bot uses automated scripts to fetch, analyze and file information from web servers at many times the speed of a human. Some bots are good, for example bots that help search engines work properly, while other bots can be used to launch malicious attacks.

The action of these bot originated robo-clicks results in incorrect statistics in security awareness system consoles that track user responses to real and simulated phishing emails, because it appears the user has clicked on a link in an email when in fact the email has never been presented to the user. Incorrect information for company accounts (accounts) can be proactively avoided by the security awareness system automatically identifying suspect IP addresses for dispositioning by the security awareness system administrator, such that user events associated with robo-clicks can be removed from user statistics prior to companies identifying that the statistics are incorrect.

BRIEF SUMMARY OF THE DISCLOSURE

Simulated phishing campaigns may be used to identify users that are susceptible to actual phishing attacks, such that these users can be provided training to lower their susceptibility risk. Accurate user statistics are important in identifying which users are susceptible to actual phishing attacks so that the appropriate training can be provided to them.

Methods, systems and apparatus are provided which allow a server of a security awareness system to associate IP addresses with events representing user interactions with simulated phishing campaigns. The server receives a plurality of events related to one or more simulated phishing campaigns for a plurality of accounts. The server determines if an IP address of the plurality of IP addresses is associated with one or more events for multiple accounts of the plurality of accounts. Based upon this determination, the server provides identification of the IP address as suspected as having the one or more events associated with it not originating from any user of the multiple accounts. The server receives an indication of whether the IP address is validated as having the one or more events originating from a bot instead of a user of one of the multiple accounts.

The methods, system and apparatus provided further enable the server to modify previous and future user statistics with respect to simulated phishing campaigns such that any user events associated with an IP address validated as originating from a bot are not included in user statistics reported for accounts.

In one embodiment, the method further includes receiving, by the server, the plurality of events comprising clicks on one or more links of one or more campaigns and IP addresses of devices of the users clicking on the one or more links of the one or more campaigns.

In one embodiment, the method further includes receiving, by the server, the plurality of events comprising automatic clicks on one or more links of one or more campaigns from at least one of a network device or a software, and IP addresses of the at least one of the network device or the software.

In one embodiment, the method further includes performing, by the server, one or more queries on a database comprising the plurality of events to determine which accounts of the plurality of accounts have events associated with the same IP address.

In one embodiment, the method further includes determining, by the server, that a first account of the plurality of accounts has at least a first event associated with a first IP address and that a second account of the plurality of accounts has at least a second event associated with the first IP address.

In one embodiment, the method further includes determining, by the server, a number of occurrences of the IP address across multiple accounts and a number of unique accounts of the plurality of accounts for which the IP address is associated.

In one embodiment, the method further includes providing, but the server, a user interface to display identification of the IP addresses suspected as having the one or more events originating from a user of the multiple accounts.

In one embodiment, the method further includes providing, by the server, a number of occurrences of the IP address across multiple accounts and a number of unique accounts of the plurality of accounts for which the IP address is associated.

In one embodiment, the method further includes receiving, by the server, specification of a rule identifying whether the IP address is validated as a bot or a user and automatically determining, by the server, whether the rule overlaps with any other rules.

In one embodiment, the method further includes updating, by the server, user statistics for events associated with simulated and/or real phishing attacks based on one or more rules identifying whether the IP address associated with a user event associated with a simulated or real phishing attack is validated as a bot.

In one embodiment, a system is provided for receiving a search for an IP address, the system further enabled to find one or more rules that relate to an IP address range affecting the IP address and to report the one or more rules that affect the IP address.

In some implementations, an editing tool is provided by the server which allows an administrator of a security awareness system to edit IP ranges identified by the server as suspected as having the one or more events not originating from any user of the multiple accounts.

In one embodiment, the editing tool provided by the server allows an administrator of a security awareness system to disposition the identified IP range and classify it as human or bot. In one embodiment, the method further allows an administrator to assign tags to the identified IP range. In some embodiments, the administrator can enter notes for the identified IP range.

In some embodiments, the system further provides information about the identified IP ranges, including one or more of a user email, a user ID, an opened date, a clicked date, an attachment, a date entered, a macro identifier, a user agent identifier, platform information, browser information, operating system information, and a company account name.

In one embodiment, the server is further enabled to provide a display of all identified IP address ranges, with additional sorting into unknown ranges, bot ranges, and human ranges.

In one embodiment, the server is further enabled to filter a display of identified IP addresses based on the number of events that the IP address range is associated with. In a further embodiment, the server is enabled to filter a display of identified IP addresses based on a number of accounts that are associated with the events that the IP address range is associated with.

In one embodiment, the security awareness system provides a user interface which allows an administrator to manually enter and classify IP address ranges in the system. In one embodiment, the security awareness system identifies these manually entered IP address ranges as seeded.

In one embodiment, the security awareness system provides a user interface which allows an administrator to merge two or more separate identified IP address ranges into one IP address range with one set of tags and one classification. In one embodiment, if an administrator merges two or more separate identified IP address range into one merged IP address range, the individual IP address ranges are no longer displayed on the user interface.

In one embodiment, the security awareness system provides a user interface which allows an administrator to delete all user events associated with an IP address range. In one embodiment, the administrator has the option to delete only those user events associated with the IP address range that occurred in the last 30 days. In one embodiment, the user events are clicks on links of simulated phishing emails associated with one or more campaigns.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3A depicts an implementation of a method for providing identification of an IP address as suspect and receiving an indication of whether the IP address is validated as a bot or a human;

FIG. 3D depicts an implementation of a method for providing identification of an IP address as suspect wherein determining that an IP address of the plurality of IP addresses is associated with one or more events for multiple accounts of the plurality of accounts comprises determining a number of occurrences of the IP address across multiple accounts and a number of unique accounts of the plurality of accounts for which the IP address is associated;

FIG. 3E depicts an implementation of a method for providing identification of an IP address as suspect wherein providing the identification comprises providing a user interface to display the identification of the IP addresses suspected as having the one or more events originating from a user of one of the multiple accounts;

FIG. 3F depicts an implementation of a method for providing identification of an IP address as suspect wherein providing the identification comprises providing a number of occurrences of the IP address across multiple accounts and a number of unique accounts of the plurality of account for which the IP address is associated;

FIG. 3G depicts an implementation of a method for providing identification of an IP address as suspect and receiving an indication of whether the IP address is validated as a bot or a human, wherein the validation comprises receiving, via a user interface, an indication that the IP address is from a bot instead of a user of one of the multiple accounts;

FIG. 3H depicts an implementation of a method for providing identification of an IP address as suspect and receiving an indication of whether the IP address is validated as a bot or a human, wherein the server further receives specification of a rule identifying whether the IP address is validated as a bot or a user and wherein the server automatically determines whether the rule overlaps with any other rules;

FIG. 5 is an illustration of a matrix display of IP address ranges that the system has identified as suspect and needing review;

FIG. 6 is an illustration of a matrix display of IP address ranges that the system has identified as suspect and needing review, further providing additional information;

FIG. 8 is an illustration of a list of IP address ranges that have been classified as bots, illustrating the filtering of the IP address ranges according to the number of events that they are associated with;

FIG. 9 is an illustration of a user interface enabling an administrator of a security awareness system to merge two or more IP address ranges into a single merged IP address range.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for providing user interfaces based on actions associated with untrusted emails.

A. Computing and Network Environment

Figure 1A:
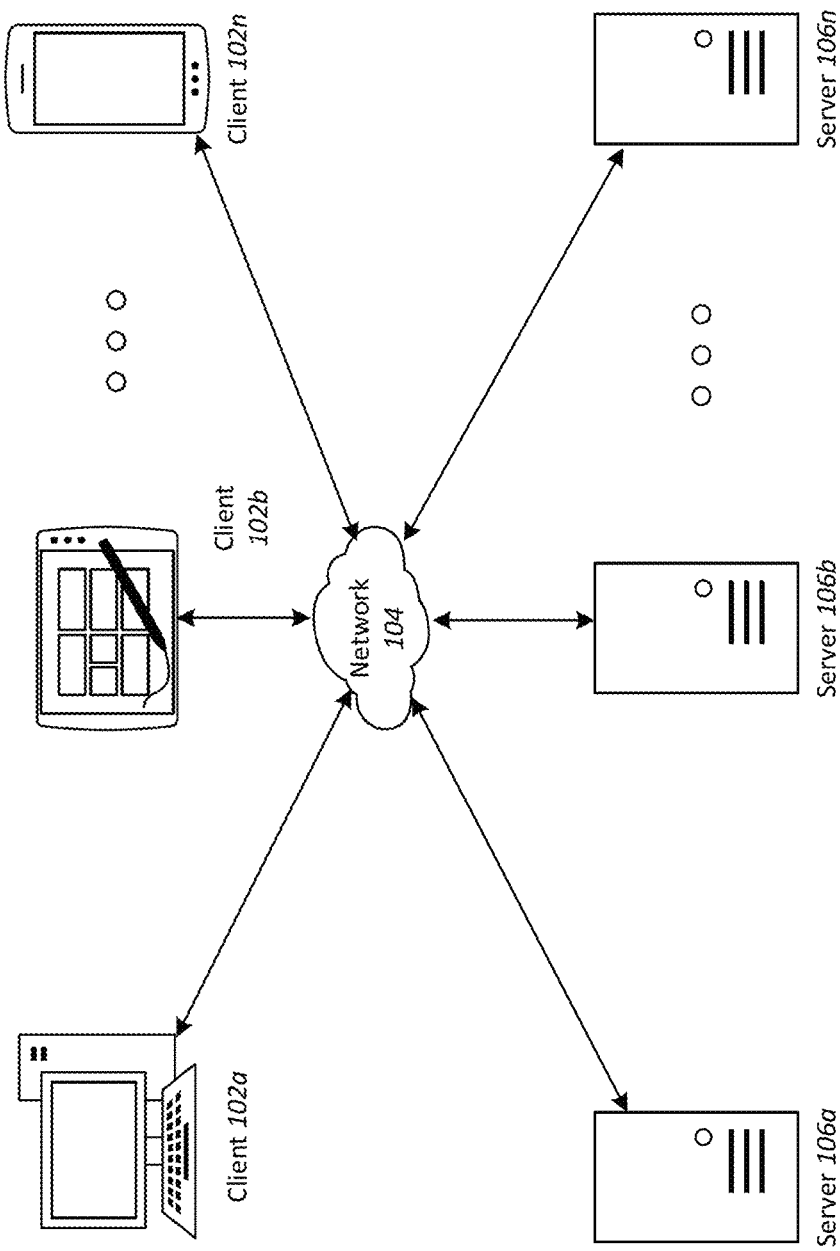
FIG. 1A is a block diagram depicting an embodiment of a network environment comprising a client device in communication with a server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers 106 may be referred to as a server farm (not shown) or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
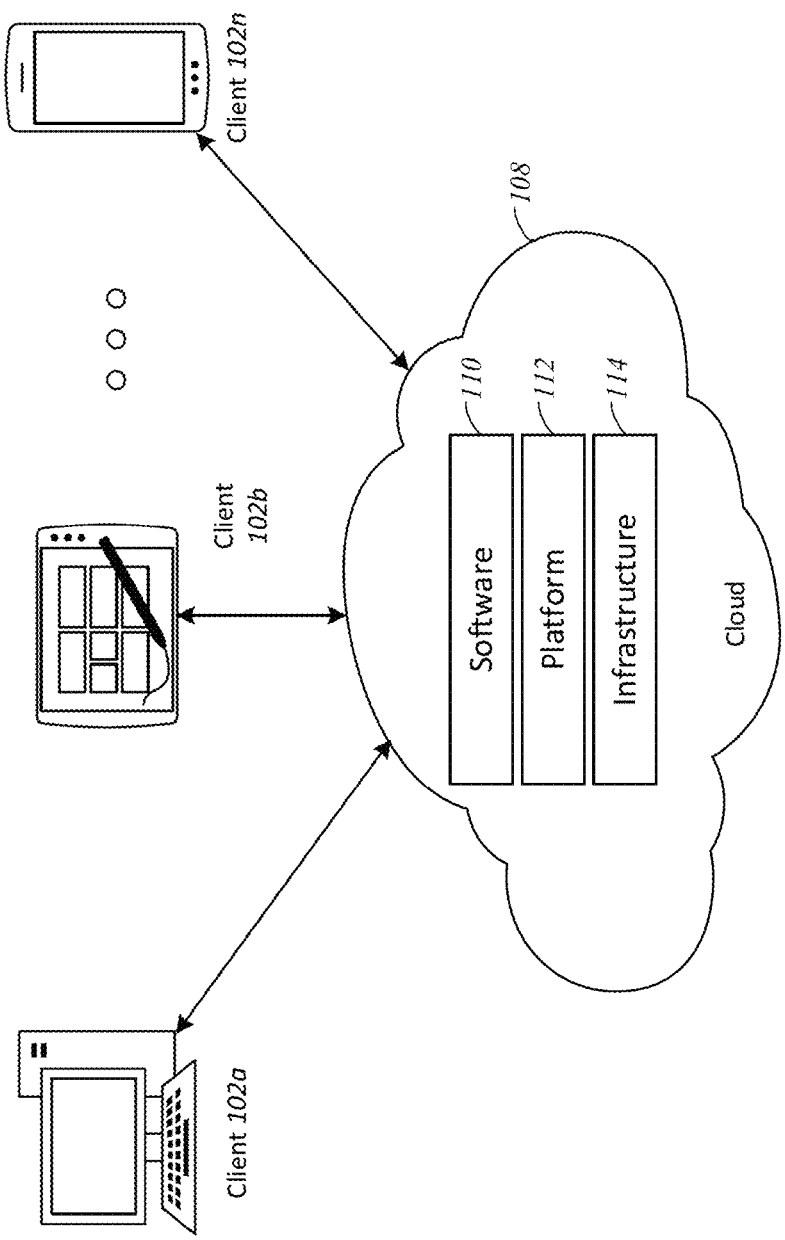
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with a cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients 102. The servers 106 may be located off-site in remote geographical locations as disclosed above or otherwise. Public clouds may be connected to the servers 106 over a public network. Private clouds may include private servers 106 that are physically maintained by clients 102 or owners of clients 102. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS 114 may refer to a user renting the use of infrastructure resources that are needed during a specified time period. IaaS providers may offer storage, networking, servers or virtualization resources from large pools, allowing the users to quickly scale up by accessing more resources as needed. Examples of IaaS 114 include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS 112 include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS 110 include GOOGLE APPS provided by Google Inc., SALESFORCE provided by Salesforce.com Inc. of San Francisco, Calif., or OFFICE 365 provided by Microsoft Corporation. Examples of SaaS 110 may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server 106 or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
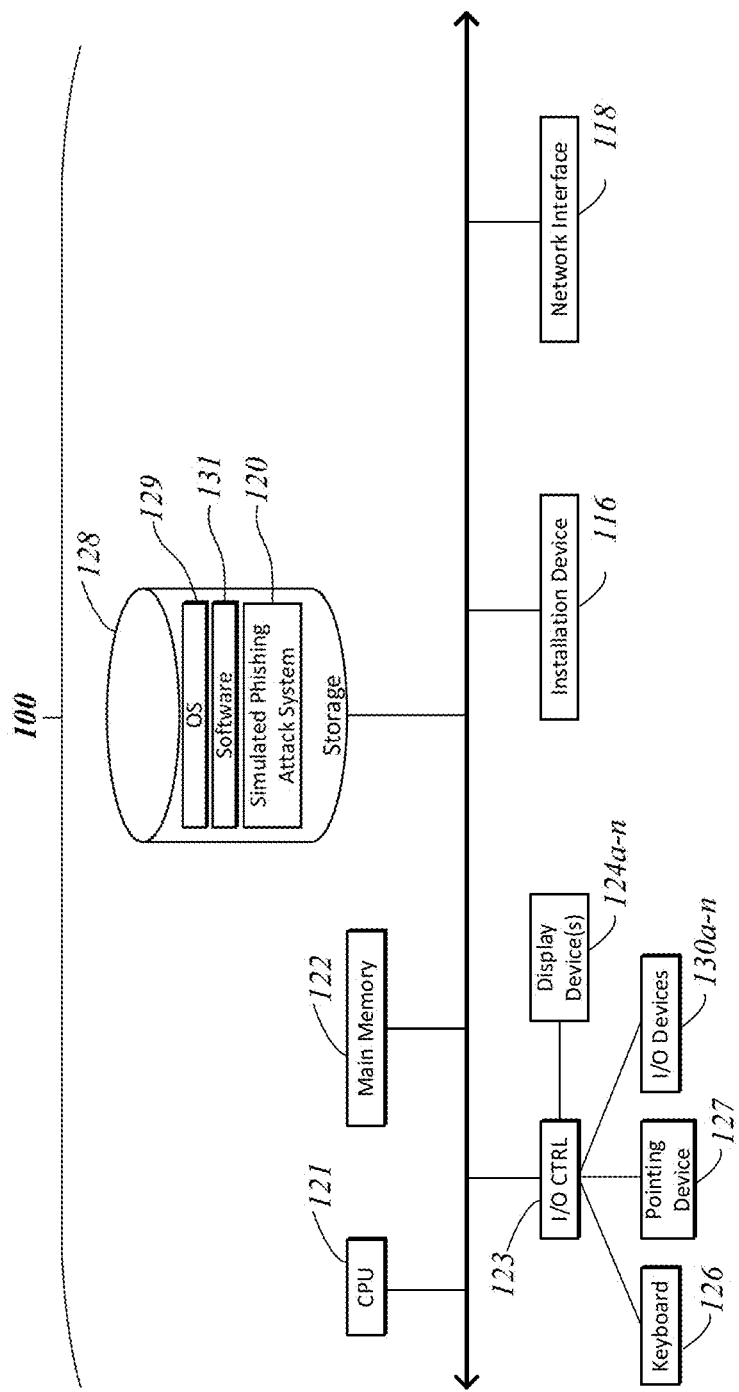
FIGS. 1C and 1D are block diagrams depicting embodiments of computing devices useful in connection with the methods and systems described herein.
Figure 1D:
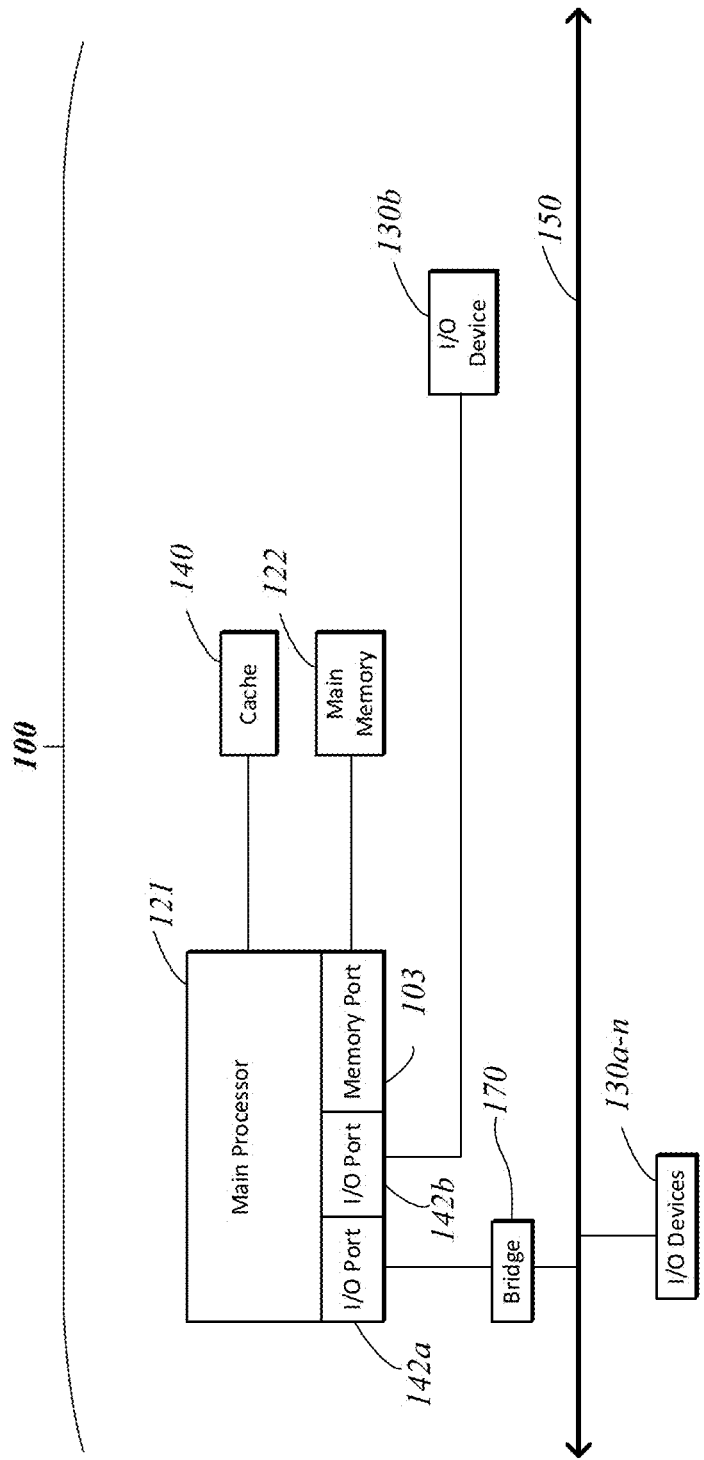

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit (CPU) 121, and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g. a mouse. The storage device 128 may include, without limitation, an operating system 129, a software 131, and a software of a simulated phishing attack system 120. As shown in FIG. 1D, each computing device 100 may also include additional optional elements, e.g. a memory port 103, a bridge 170, one or more input/output devices 130a-130n (generally referred to using reference numeral 130), I/O ports 142a-142b, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the central processing unit 121 (e.g., microprocessor). Main memory unit 122 may be volatile and faster than storage device 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage device 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the central processing unit 121 (e.g., a main processor) communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the main processor 121 communicates with various I/O devices 130 via a local system bus 150. Various buses may be used to connect the main processor 121 to any of the I/O devices 130 via I/O ports 142a-142b, including a PCI bus, a PCI-X bus, or a PCI-Express bus, or a NuBus. For embodiments in which the I/O device is a video display device 124, the main processor 121 may use an Advanced Graphics Port (AGP) to communicate with the display device 124 or the I/O controller 123 for the display device 124. FIG. 1D depicts an embodiment of a computing device 100 in which the main processor 121 communicates directly with I/O device 130b or other processors 121' (not shown) via HYPERTRANSPORT, RAPIDIO, or INFINIBAND communications technology (via I/O port 142b). FIG. 1D also depicts an embodiment in which local busses and direct communication are mixed: the main processor 121 communicates with I/O device 130a using a local interconnect bus while communicating with I/O device 130b directly (via I/O port 142a).

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

I/O devices 130a-130n may include a combination of multiple input or output devices, including, e.g., Microsoft KINECT, Nintendo Wiimote for the WII, Nintendo WII U GAMEPAD, or Apple IPHONE. Some I/O devices 130a-130n allow gesture recognition inputs through combining some of the inputs and outputs. Some I/O devices 130a-130n provides for facial recognition which may be utilized as an input for different purposes including authentication and other commands. Some I/O devices 130a-130n provides for voice recognition and inputs, including, e.g., Microsoft KINECT, SIRI for IPHONE by Apple, Google Now or Google Voice Search.

Additional I/O devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices 130a-130n may be controlled by an I/O controller 123 as shown in FIG. 1C. The I/O controller 123 may control one or more I/O devices 130a-130n, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices 124a-124n may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b (not shown) connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the computing device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system 129 or other related software, and for storing application software programs such as any program related to the simulated phishing attack system software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices 128 may include multiple volatile and non-volatile memories, including, e.g., solid state hybrid drives that combine hard disks with solid state cache. Some storage device 128 may be non-volatile, mutable, or read-only. Some storage devices 128 may be internal and connect to the computing device 100 via a system bus 150. Some storage devices 128 may be external and connect to the computing device 100 via an I/O device 130 that provides an external bus. Some storage devices 128 may connect to the computing device 100 via the network interface 118 over a network 104, including, e.g., the Remote Disk for MACBOOK AIR by Apple. Some computing devices 100 (e.g., client devices 102) may not require a non-volatile storage device 128 and may be thin clients 102 or zero clients 102. Some storage devices 128 may also be used as an installation device 116, and may be suitable for installing software and programs. Additionally, the operating system 129 and the software 131 can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computing device 100 (i.e., computer system) can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computing device 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 (i.e., client device) includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods of Providing User Interfaces Based on Actions Associated with Untrusted Emails.

This disclosure generally relates to systems and methods for automatically discovering internet protocol (IP) addresses that may be associated with a bot instead of a human, and providing a user interface to disposition the identified suspect IP addresses and classify them as bot or human. The disclosure further provides systems and methods for updating user event statistics related to simulated phishing campaigns when the user event is associated with an IP addresses that has been validated as a bot IP address.

A simulated phishing attack may test the readiness of a security system or users of a system to handle phishing attacks such that malicious actions are prevented. A simulated phishing attack or actual phishing attack may, for example, target a large number of users, such as employees of an organization or company. Such attacks may be performed by a party friendly or neutral to the targets of the attacks. In one type of phishing attack, an attempt is made to extract sensitive information using phishing methods. For the simulated phishing attack, any extracted information is used not for malicious purposes, but as part of a process of detecting weaknesses in security. Performing the simulated phishing attack can help expose a lack of vigilance and/or know-how in a user or set of users of a device. This information can be used to provide targeted training or remedial actions in order to minimize risk associated with such attacks. For example, user know-how can be improved by providing targeted, real-time training to the user at the time of failing a test provided by the simulated phishing attack.

Phishing attacks occur frequently by way of phishing emails. Phishing emails are typically masqueraded as emails from parties known to the users, such as an executive of a company that employs the users. The phishing emails may be designed to appear interesting to the users, and may offer or promise, for example, access to an interesting tidbit of news, access to useful computer software, access to knowledge of how to perform a money-making scheme, or any other thing that may be of interest. In some embodiments, the phishing emails may request that the user perform a certain action, such as clicking on a link, providing sensitive information by replying to the email, or transferring money to an account owned by the attacker and then sending a reply email to confirm that the money has been transferred. A common attack vector used by phishing emails is to get users to click on links in an email or to click on links delivered in documents attached to phishing emails. Any such action that a user may perform on a simulated phishing email is referred to as an event. Events may be associated with a user email account. Events may also be associated with a simulated phishing campaign. Events may also be associated with accounts of a client company of the security awareness system provider. IP address ranges contain one or more consecutive IP addresses, and may be referred to interchangeably as IP address ranges, IP addresses, or IP ranges.

The present solution offers several benefits to security awareness system providers and to client companies with respect to cybersecurity training. The present invention may proactively improve accuracy with respect to user statistics related to simulated phishing campaigns as well as real world phishing attacks. Specifically, the present invention automatically identifies IP address ranges of a plurality of IP address ranges associated with a plurality of events, that are suspected of having the one or more events not originating from any user. The present invention provides the suspect IP address ranges to the security awareness system administrator along with information related to the events associated with the IP address ranges. The present invention additionally enables filtering of the list of suspect IP address ranges provided to the security awareness system administrator, such that the administrator may easily see which IP address range has been associated with the greatest number of events, or which IP address range has been associated with the greatest number of unique accounts associated with the events.

The present solution functions by querying a database of reported events from a plurality of users associated with a plurality of accounts running simulated phishing campaigns. The present invention provides a matrix display of all IP addresses associated with reported events that are associated with two or more accounts, and allows filtering of the IP address ranges by the number of events and by the number of unique accounts.

The present solution has several possible applications. For example, the present invention can ensure that accurate user statistics are generated based on the events received by the system, by providing to the administrator information related to IP ranges that are suspected of not being human. In this way, the present invention ensures that the system accurately identifies users that are more susceptible to attacks, and that would benefit from enhanced security training.

The present solution is also configured to enable a security awareness system administrator to proactively ignore events of one or more campaigns for a plurality of accounts, wherein the events are associated with an IP address range that has been classified as a bot. The present invention is also configured to enable a security awareness system administrator to retroactively remove events from one or more campaigns for a plurality of accounts from a database of events, because the events are associated with an IP address range that has been classified as a bot. The present invention is further configured to allow the security awareness system administrator to configure rules that relate to an IP address range, wherein the rules impact how events received by the server are accounted for in gathered statistics. In some aspects, the present invention serves to allow the security awareness system administrator to search for an IP address or a range of IP addresses to determine if any rules have been set that affect the IP address. In some aspects, the present invention maintains a "last seen" date for an IP address associated with a rule for how to count user events, wherein the last seen date is updated each time a new user event associated with an IP address associated with the rule is received by the server, from one of a plurality of campaigns for one of a plurality of accounts. In some aspects, the present invention may alert the security awareness system administrator when the last seen date is sufficiently far in the past, such that the administrator may analyze the IP address range rule to determine if it should remain active. In some aspects, the present invention will alert the administrator any time the administrator attempts to create a new rule for an IP address range that overlaps with an existing rule for an IP address range. In some aspects, if the new rule for an IP address range overlaps with an existing rule for an IP address range, and the rule instructs the same behavior for both of the overlapping IP address ranges, then the present invention will automatically merge the two rules into one rule. In some aspects, if the new rule for an IP address range overlaps with an existing rule for an IP address range, and the rule instructs the opposite behavior for each of the overlapping IP address ranges, then the present invention may provide the overlapping IP address range to the security awareness system administrator for disposition and classification. In some aspects, the present invention may provide both the IP address ranges and their proposed rules which instruct the opposite behavior, to the security awareness system administrator, and the server may highlight the overlapping IP address ranges, and the server may require that the administrator disposition and re-classify both of the IP address ranges. In some aspects, a security awareness system administrator may specify in advance a rule for how to handle a situation where a new rule conflicts with an existing rule.

The present solution provides several benefits. The previous solution was creation and use of a manually updated list of IP addresses or IP address ranges which should be ignored when calculating a user's statistics with respect to clicking on suspicious links. This list is reactively updated in a remediation process in response to customer company complaints reporting incorrect user activity shown in their consoles. In response to the complaint, the security awareness system administrator would then have to research all the clicks in the user activity and determine which of them could have been caused by bots or other services, i.e. not the company's users themselves. If the administrator determine that the incorrect user activity corresponds to false clicking information then the IP addresses associated with those clicks is added to the list of ignored IP addresses. Then this list is used by a security awareness system administrator to remove recorded clicks associated with the ignored IP addresses, and to create rules which determine how to handle clicks associated with specific IP addresses or IP address ranges. The present invention is entirely managed at the server and no client software needs to be installed and the client side does not need to manage or be aware of the service. The present invention provides the benefit of more accurate phishing campaign reporting, and fewer customer complaints due to inaccurate reporting caused by robo-clicks.

Figure 2:
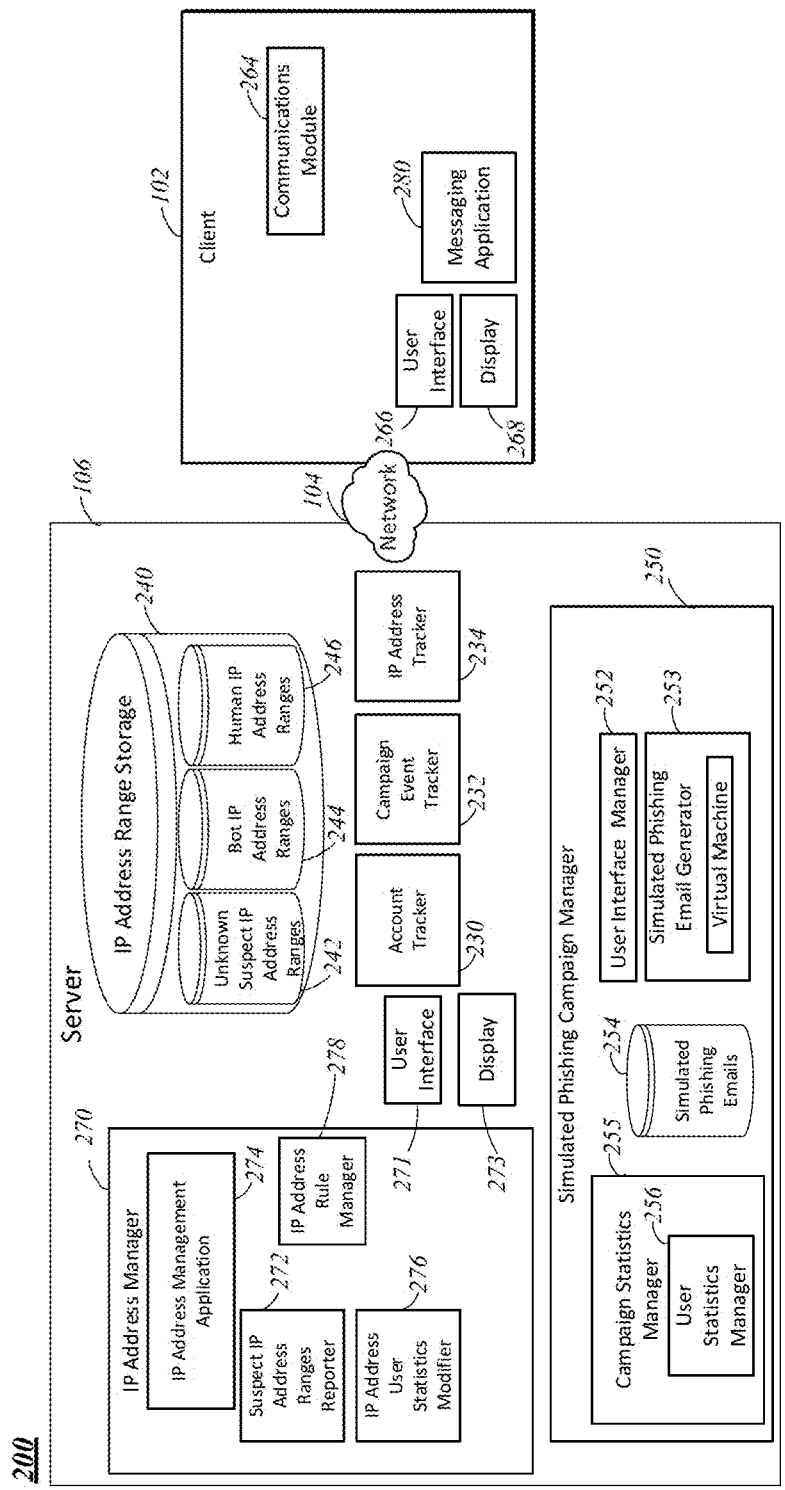
FIG. 2 depicts some of the architecture of an implementation of a system that includes a server, a client device, and a network configured to provide user interfaces based on actions associated with untrusted emails.

Referring to FIG. 2 in a general overview, FIG. 2 depicts some of the architecture of an implementation of a system 200 capable of automatically discovering IP addresses that may be associated with a bot instead of a human, providing a user interface for an administrator to disposition the identified suspect IP addresses and classify them as bot or human, and capable of updating user event statistics related to simulated phishing campaigns when the user event is associated with an IP addresses that has been validated as a bot IP address.

System 200 includes a server 106. The server 106 includes an IP address manager 270, which includes an IP address management application 274, which is responsible for managing IP address ranges associated with user events associated with campaigns. The IP address manager 270 also includes a suspect IP address ranges reporter 272, an IP address user statistics modifier 276, and an IP address rule manager 278. The IP address manager 270 further includes a user interface 271 and a display 273, which may be used to provide suspect IP address to the security awareness system administrator, and to receive indications from the administrator. The server 106 includes a simulated phishing campaign manager 250, which is responsible for executing simulated phishing campaigns. The simulated phishing campaign manager 250 includes a campaign statistics manager 255 and a user statistics manager 256, which are responsible for keeping track of user interactions with simulated phishing emails. The simulated phishing campaign manager 250 also includes a user interface manager 252 and a simulated phishing email generator 253, which may contain a virtual machine. The server 106 includes several storage modules. IP address ranges are stored in storage 240, which is further broken down into unknown suspect IP address ranges 242, bot IP address ranges 244, and human IP address ranges 246. Simulated phishing emails are stored in storage 254. The server further includes an account tracker 230, a campaign event tracker 232, and an IP address tracker 234.

Each of the server 106, IP address manager 270, IP address management application 274, IP address rule manager 278, suspect IP address ranges reporter 272, IP address user statistics modifier 276, simulated phishing campaign manager 250, user interface manager 252, simulated phishing email generator 253, campaign statistics manager 255, user statistics manager 256, account tracker 230, campaign event tracker 232, and IP address tracker 234 may comprise a program, service, task, script, library, application or any type and form of executable instructions or code executable on one or more processors. Any of the server 106, IP address manager 270, IP address management application 274, IP address rule manager 278, suspect IP address ranges reporter 272, IP address user statistics modifier 276, simulated phishing campaign manager 250, user interface manager 252, simulated phishing email generator 253, campaign statistics manager 255, user statistics manager 256, account tracker 230, campaign event tracker 232, and IP address tracker 234 may be combined into one or more modules, applications, programs, services, tasks, scripts, libraries, applications, or executable code.

System 200 includes client 102. Each client includes a communications module 264, a messaging application 280, a user interface 266, and a display 268. Each of the client 102, communications module 264, a messaging application 280, user interface 266, and display 268 may comprise a program, service, task, script, library, application or any type and form of executable instructions or code executable on one or more processors. Any of the client 102, communications module 264, a messaging application 280, user interface 266, and display 268 may be combined into one or more modules, applications, programs, services, tasks, scripts, libraries, applications, or executable code.

The simulated phishing campaign manager 250 includes a simulated phishing email generator 253, which may be implemented as, or contain, a virtual machine. The simulated phishing campaign manager 250 also includes a user interface manager 252. Responsive to a user input, the simulated phishing campaign manager 250 generates a campaign for a simulated phishing attack, including one or more selected phishing email templates, one or more selected landing page templates, and one or more selected targeted user groups, in addition to other user input. The simulated phishing campaign manager includes campaign statistics manager 255 and user statistics manager 256, which track and maintain statistics of interactions with the simulated phishing emails by a plurality of users of the one or more selected targeted user groups. The campaign statistics manager 255 tracks and maintains statistics related to a specific campaign, and the user statistics manager 256 tracks and maintains statistics related to a specific user.

In an implementation, system 200 includes a server 106. The server 106 may be a part of a cluster of servers 106. In some embodiments, tasks performed by the server 106 may be performed by a plurality of servers. These tasks may be allocated among the cluster of servers by an application, service, daemon, routine, or other executable logic for task allocation. The server 106 may include a processor and a memory.

The simulated phishing campaign manager 250 may manage various aspects of a simulated phishing attack campaign. For example, the simulated phishing campaign manager 250 may process input from the server 106 and/or may provide access as needed to various applications, modules, and other software components of the server 106 to other various applications, modules, and other software components of the server 106. The simulated phishing campaign manager 250 may monitor and control timing of various aspects of a simulated attack campaign, may process requests for access to simulated attack campaign results and statistics, and/or may perform other tasks related to the management of a simulated attack campaign.

In some embodiments, the simulated phishing campaign module 250 may be integrated with or coupled to main memory 122. In some embodiments, the main memory 122 may include any type and form of storage, such as a database or file system. The main memory 122 may store data such as parameters and scripts associated with a particular simulated phishing campaign. In an example, the main memory 122 may store a set of parameters and scripts corresponding to the choices made by a server 106 through a simulated phishing campaign manager 250, e.g. as described above for a particular simulated phishing attack.

In an implementation, the simulated phishing campaign manager 250 includes a simulated phishing email generator 253. The simulated phishing email generator 253 may be integrated with or coupled to the main memory 122 so as to provide the simulated phishing email generator 253 access to parameters associated with messaging choices made for a particular simulated campaign by e.g. the server 106. The simulated phishing email generator 253 may be integrated with or coupled to memory or a memory store or otherwise a storage, such as a database, containing simulated phishing emails 254. The simulated phishing email generator 253 may be integrated with or coupled to an account tracker 230, a campaign event tracker 232, and an IP address tracker 234. The simulated phishing email generator 253 may be an application, service, daemon, routine, or other executable logic for generating messages. The messages generated by the simulated phishing email generator 253 may be of any appropriate format. For example, they may be email messages, text messages, messages used by particular messaging applications such as, e.g., WhatsApp™, or any other type of message. The message type to be used in a particular attack may be selected by e.g. a server 106 using a simulated phishing campaign manager 250. The messages may be generated in any appropriate manner, e.g. by running an instance of an application that generates the desired message type, such as running e.g. a Gmail™ application, Microsoft Outlook™, WhatsApp™, a text messaging application, or any other appropriate application. The messages may be generated by running a messaging application on e.g. a virtual machine, or may simply be run on an operating system of the server 106, or may be run in any other appropriate environment. The messages may be generated to be formatted consistent with specific messaging platforms, for example Outlook 365, Outlook Web Access (OWA), Webmail, iOS, Gmail client, and so on. In some embodiments, the simulated phishing email generator 253 can be configured to generate messages having the ability to traverse users who interact with the messages to a specific landing page.

In some embodiments, the simulated phishing email generator 253 can be configured to generate a simulated phishing email. The email can appear to be delivered from a trusted email address, such as the email address of an executive of the company at which the target is employed. In addition, the email can have a "Subject:" field that is intended to cause the user to take an action, such as initiating a wire transfer. In some embodiments, the simulated phishing email generator 253 can generate one or more simulated phishing emails which are stored in the simulated phishing emails storage 254. In some embodiments, the simulated phishing email generator 253 can generate multiple instances of the email which may be delivered to the clients 102 via a network 104. For example, the server 106 can select any number of employees who should be targeted by a simulated attack. The simulated phishing email generator 253 can generate a set of emails similar to the email, each addressed to a respective target identified in the information stored in the memory 122. That is, the simulated phishing email generator 253 can generate the emails such that the "From:" and "Subject:" fields of each email are identical, while the "To:" field is adjusted according to the desired targets.

The IP address manager 270 manages the IP address range storage 240. The IP address management application 274 monitors the account tracker 230, the campaign event tracker 232 and the IP address tracker 234, for instances where events (such as a link in a simulated phishing email being clicked on) associated with campaigns for more than one account are associated with the same IP address. When this occurs, the IP address is added to the IP address range storage 240, in the unknown suspect IP address ranges 242. The suspect IP address ranges reporter 272 generates a report of all the IP addresses in the IP address range storage 240, and displays these in a matrix where the IP address are arranged according to whether they are unknown ranges (from storage 242), bot ranges (from storage 244), or human ranges (from storage 246). The suspect IP address ranges reporter 272 may provide the display of IP address ranges to a security awareness system administrator via a display 273. The display may be connected to a user interface 271, which enables the administrator to disposition the unknown suspect IP address ranges provided by the IP address management application 274. The administrator may create a new rule, and enter the rule using the user interface 271. The IP address rule manager 278 includes a storage where it stores all IP address rules. The IP address rule manager 278 incorporates new rules, and determines whether the new rules overlap any existing rules. When there is an overlap between a new rule and an existing rule, the IP address rule manager 278 may notify the administrator using the display 273, and may allow input from the administrator on how to classify the overlapping IP addresses. Once a rule is established, the IP address user statistics modifier 276 accepts input from the administrator as to whether to, and how to, retroactively apply the rule. If the administrator chooses to retroactively apply the rule, for example for all user events associated with the IP address, or just those user events associated with the IP address that occurred in the last 30 days, then the IP address user statistics modifier 276 communicates with the user statistics manager 256 in order to modify the user statistics by removing user events associated with the bot IP addresses so that these events do not contribute to a user's statistics. If the administrator establishes a rule but chooses not to retroactively apply the rule to the user statistics, then the server compares the IP address associated with any subsequent user event associated with a campaign, and if there is a match between the IP address associated with the event and the event itself, then the event is determined false and it is not counted towards the user's campaign statistics. For an event received by the server, the IP address associated with the event is compared to all the rules known to the IP address rules manager 278. If the IP address associated with the event belongs to a rule which indicates that the event was associated with a bot, then the event does not get passed to the campaign statistics manager 255 and therefore the event does not influence any campaign or user statistics.

In an implementation, a simulated phishing campaign manager 250 may be e.g., another name for a security awareness system administrator, such as a security manager, a third-party security consultant, a risk assessor, or any other party that uses the simulated phishing campaign manager 250 installed on a server 106. In one implementation, an IP address manager 270 may be e.g. another name for a security awareness system administrator, such as a security manager, a third-party consultant, a risk assessor, or any other party that uses the IP address manager 270 installed on a server 106. The server 106 may wish to direct a simulated phishing attack by interacting with the simulated phishing campaign manager 250 installed on the server 106. The simulated phishing campaign manager 250 may be, for example, a desktop computer, a laptop computer, a mobile device, or any other suitable computing device. The simulated phishing campaign manager 250 may be e.g., an application on a device that allows for a user of the device to interact with the server 106 for e.g. purposes of creating, configuring, tailoring and/or executing a simulated phishing attack and/or viewing and/or processing and/or analyzing the results of a phishing attack.

In an implementation, the simulated phishing campaign manager 250, when executed, causes a graphical user interface 271 to be displayed to the server 106. In other embodiments, the simulated phishing campaign manager 250 allows for administrator input through a non-graphical user interface 271, such as a user interface that accepts text or vocal input without displaying an interactive image. A graphical user interface may be displayed on a screen of a mobile phone, or a monitor connected to a desktop or laptop computer, or may be displayed on any other display 273. The administrator may interact with e.g. the graphical user interface on the device by typing, clicking a mouse, tapping, speaking, or any other method of interacting with a user interface. The graphical user interface on the device may be a web-based user interface provided by a web browser (e.g. GOOGLE CHROME, Microsoft INTERNET EXPLORER, or Mozilla Firefox provided by Mozilla Foundation of Mountain View, Calif.), or may be an application installed on a user device capable of opening a network connection to simulated phishing campaign manager 250 or IP address manager 270, or may be any other type of interface.

In an implementation, the simulated phishing campaign manager 250 and/or server 106 may make choices concerning how a simulated phishing attack is to be carried out. For example, a graphical user interface run by the simulated phishing campaign manager 250 may be displayed to the server 106. An administrator via the server 106 may input parameters for the simulated attack that affect how it will be carried out. For example, via the server 106 an administrator may make choices as to which users to include as potential targets in the simulated attack, the method of determining which users are to be selected as targets of the simulated attack, the timing of various aspects of the simulated attack, whether to use a simulated attack template that includes values for one or a plurality of failure indicators, how responses from targeted users should be uniquely identified, and other choices. These choices may be made by selecting options displayed on a graphical user interface from drop-down menus, being presented with choices through a simulated attack wizard, or in any other appropriate manner. The simulated phishing campaign manager 250 may include data collected from targets, records of failures such as a listing of which targets replied to a simulated phishing email, systemic or other security measures in place during the simulated phishing attacks, time or date logs, user identifiers, data detailing the results or analysis of attack results including data that indicates associations between attack results, and any other appropriate data. The server 106 may view, save, share, print, or perform any other appropriate action with the attack results. The simulated phishing campaign manager 250 may perform analysis on the attack results, possibly upon request of the server 106. For example, this analysis may include determining which users are a security risk based on having a number of failures above a predetermined threshold, or whether certain security systems in place are effective by e.g. correlating the presence of such security systems with a lower than average incidence of failures. The simulated phishing campaign manager 250 may allow an administrator to view, on a graphical user interface 271 for example a timeline of overall failure rates, which may be useful in helping to determine whether a security policy that was instituted at a particular time was effective in improving security.

In an implementation, the simulated phishing campaign manager 250 may allow the server 106, such as via application programming interfaces (APIs), to access and/or change settings of an account maintained with any party involved with the attack, such as, for example, a third-party security service provider, or may allow the administrator to access and/or change settings of an account maintained with a third party security service provider, such as one that e.g. manages an exploit server, view bills and/or make payments to a third party security service provider, to perform these functions with other third parties involved in the attack, or provide any other functions that would be appropriate for facilitating communications between the server 106 and any other parties involved in the attack.

The system 200 also includes client 102. A client 102 may be a target of any simulated phishing attack or actual phishing attack. For example, the client may be an employee, member, or independent contractor working for an organization that is performing a security checkup or conducts ongoing simulated phishing attacks to maintain security. The client 102 may be any device used by the client. The client need not own the device for it to be considered a client device 102. The client 102 may be any computing device, such as a desktop computer, a laptop, a mobile device, or any other computing device. In some embodiments, the client 102 may be a server or set of servers accessed by the client. For example, the client may be the employee or a member of an organization. The client may access a server that is e.g. owned or managed or otherwise associated with the organization. Such a server may be a client 102.

In some embodiments, the client 102 may further include a user interface 266 such as a keyboard, a mouse, a touch screen, or any other appropriate user interface. This may be a user interface that is e.g. connected directly to a client 102, such as, for example, a keyboard connected to a mobile device, or may be connected indirectly to a client 102, such as, for example, a user interface of a client device 102 used to access a server client 102. The client 102 may include a display 268, such as a screen, a monitor connected to the device in any manner, or any other appropriate display.

In an implementation, the client 102 may include a messaging application 280. The messaging application 280 may be any application capable of viewing, editing, and/or sending messages. For example, the messaging application 280 may be an instance of an application that allows viewing of a desired message type, such as any web browser, a Gmail™ application, Microsoft Outlook™, WhatsApp™, a text messaging application, or any other appropriate application. In some embodiments, the messaging application 280 can be configured to display simulated phishing attack emails. Furthermore, the messaging application 280 can be configured to allow the target to generate reply messages or forwarded messages in response to the messages displayed by the messaging application 280.

In some embodiments, the client 102 may include a communications module 264. This may be a library, application programming interface (API), set of scripts, or any other code that may facilitate communications between the client 102 and any of the server 106, a third-party server, or any other server. In some embodiments, the communications module 264 determines when to transmit information from the client 102 to external servers 106 via a network 104. In some embodiments, the information transmitted by the communications module 264 may correspond to a message, such as an email, generated by the messaging application 280.

In some embodiments, reply emails sent from the client 102 to the server 106 can be processed by the simulated phishing campaign manager 250. For example, simulated phishing campaign manager 250 can be configured to process reply emails received from one or more target clients 102 to determine the identities of the targets who sent the reply emails. In some embodiments, the identities of the targets may be determined based in part on the unique identifiers included within each reply email received by the server 106.

The system 200 may include a network 104. The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network. The network 104 connects the server 106 and a client 102. The client 102 comprises a communications module 264, a user interface 266, a display 268, a messaging application 280, and a memory such as any embodiments of main memory 122 described herein or any type and form of storage, such as a database or file system. The client 102 receives the email sent by the server 106 based upon the campaign created and executed by the simulated phishing campaign manager 250. The client 102 is able to receive the simulated phishing email via the messaging application 280, display the received email for the user using the display 268, and is able to accept user interaction via the user interface 266 responsive to the displayed email. If the user interacts with the simulated phishing email, the client 102 traverses to a landing page or display used by the simulated phishing campaign manager 250 in the phishing campaign and the details of the user interaction with the simulated phishing email are tracked by the account tracker 230, the campaign event tracker 232 and the IP address tracker 234, and are included in the campaign statistics by the campaign statistics manager 255, and are included in the user's statistics by the user statistics manager 256.

In one implementation, the system 200 uses process tree monitoring. This type of process includes modules that monitor and track user actions such as clicking on links in emails as well as opening files attached to emails and then clicking on links in the attached files from the email. For example, tracking the messaging application 280 can include tracking opening of a file explorer e.g., track a user that opens a zip file then opens a word document in zip file and then clicks on the link in the word document. As appreciated by one of skill in the art, other methods may be used to track clicking links and other user interactions with phishing related emails and documents. For example, the system 200 may look to metadata for determining whether domains and/or documents are suspect (e.g., where domains are within documents attached to emails). The metadata provides the document's heritage which can be used for determining whether the document is suspect.

Referring to FIG. 3A in a general overview, FIG. 3A depicts an implementation of a method 300 for determining whether an IP address is suspected as having one or more events not originating from a user. In step 310, the server receives a plurality of events of one or more campaigns for a plurality of accounts and a plurality of email addresses associated with the plurality of events. In step 320, the server determines that an IP address of the plurality of IP addresses is associated with one or more events for multiple accounts of the plurality of accounts. In step 330, the server provides identification of the IP address as suspected as having the one or more events not originating from any user of the multiple accounts. In step 340, the server receives an indication of whether the IP address is validated as having the one or more events originating from a bot instead of a user of one of the multiple accounts.

In step 310, the server 106 receives a plurality of events from one or more campaigns for a plurality of accounts and a plurality of IP addresses associated with the plurality of events. The simulated phishing campaign manager 250 of the server 106 oversees and manages campaigns for many accounts. Each customer of the security awareness system represents an account. Typically, an account is associated with a company or organization, and the company engages the security awareness system to provide simulated phishing campaigns to test their users for preparedness against actual phishing attacks, and to provide training to their users. The simulated phishing campaign manager 250 is therefore usually managing multiple campaigns for multiple accounts. When a user of one of the accounts interacts with a simulated phishing email, the server receives an event. In one embodiment, an event may be that the user clicked on a link in a simulated phishing email. In another embodiment, an event may be that the user clicked on a link in an attachment to a simulated phishing email. In another embodiment, an event may be that the user replied to or forwarded a simulated phishing email. More generally, an event is any user interaction with a simulated phishing email that, if the simulated phishing email were a real phishing email, would have the potential to cause harm to the user or the company or organization of the user. For every event that is received by the server, there is an IP address associated with the event. The IP address associated with the event is the IP address of the entity that performed the event. Therefore, in step 310, the server 106 receives events that are associated with a user, with an account, and with an IP address.

In step 320, the server 106 determines that an IP address of the plurality of IP address is associated with one or more events for multiple accounts of the plurality of accounts. Each event is associated with a user and each user is associated with an account, which represents, for example, a company or an organization. The IP address manager 270 looks for IP addresses that appear more than once amongst the received plurality of events. When the IP address manager 270 recognizes multiple instances of an IP address, the IP address manager 270 determines if the events associated with the multiples instances of the IP addresses were associated with users of different accounts. More generally the IP address manager 270 is seeking to determine if the same IP address is creating events across different companies or organizations. This would point to an unusual situation for IP addresses associated with humans.

In step 330, the suspect IP address ranges reporter 272 provides identification of the IP address as suspected as having the one or more events not originating from any user of the multiple accounts. In one embodiment, the suspect IP address ranges reporter 272 may provide this identification to the administrator of the security awareness system via a user interface. In one embodiment, the suspect IP address ranges reporter 272 displays a list of the IP addresses that are associated with one or more event from different accounts in a table for the administrator to review. In one embodiment, the suspect IP address ranges reporter 272 allows the administrator to filter the list of the IP addresses according to which IP address is associated with the greatest number of events. In one embodiment, the suspect IP address ranges reporter 272 allows the administrator to filter the list of the IP addresses according to which IP address is associated with events that are associated with the greatest number of different accounts. In one embodiment, the suspect IP address ranges reporter 272 displays other details about the event that the IP address is associated with, such as the user's email address, the user's ID, the account name, the date and time that the email was opened, the date and time that the link was clicked, the user's platform, the user's browser, the user's operating system, a label, a designation, and notes. In one embodiment, the information displayed for the administrator can be filtered by the tags associated with the IP address ranges.

In step 340, the IP address rule manager 278 receives an indication of whether the IP address is validated as having the one or more events originating from a bot instead of a user of one of the multiple accounts. In one embodiment, the security awareness system administrator edits one of the IP address ranges that was provided by the server, and gives the IP address range the designation of "bot". In one embodiment, the administrator merges one or more IP address ranges and gives the merged IP address range the designation of "bot".

Figure 3B:
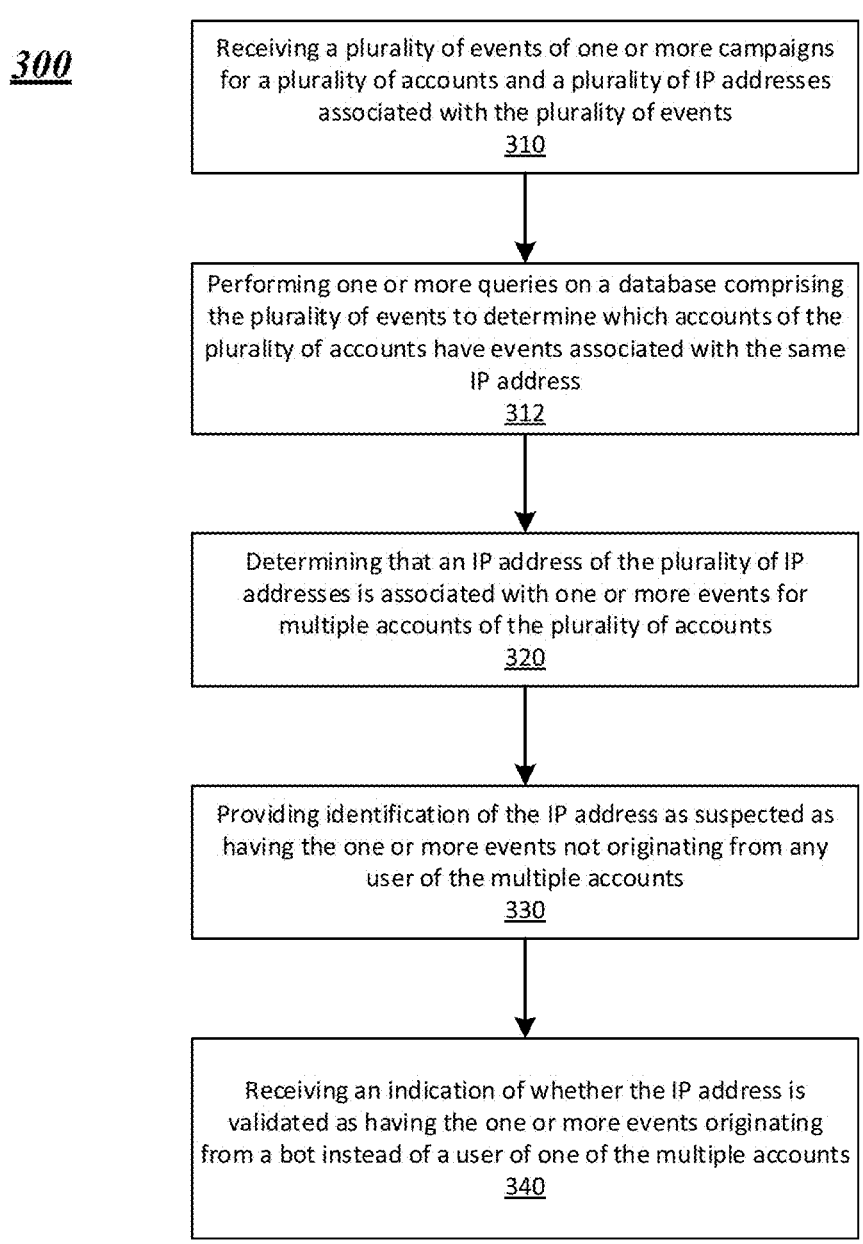
FIG. 3B depicts an implementation of a method for identifying an IP address as suspect wherein identifying comprises performing one or more queries on a database comprising a plurality of events to determine which accounts of a plurality of accounts have events associated with the same email address.

Referring to FIG. 3B in a general overview, FIG. 3B depicts an implementation of a method 300 for determining whether an IP address is suspected as having one or more events not originating from a user. In step 310, the server receives a plurality of events of one or more campaigns for a plurality of accounts and a plurality of email addresses associated with the plurality of events. In step 312, the server performs one or more queries on a database comprising the plurality of events to determine which accounts of the plurality of accounts have events associated with the same IP address. In step 320, the server determines that an IP address of the plurality of IP addresses is associated with one or more events for multiple accounts of the plurality of accounts. In step 330, the server provides identification of the IP address as suspected as having the one or more events not originating from any user of the multiple accounts. In step 340, the server receives an indication of whether the IP address is validated as having the one or more events originating from a bot instead of a user of one of the multiple accounts.

In step 312, the IP address manager 270 may query an IP address range storage 240 to determine if the IP address range has already been classified as one of a bot IP address range (e.g., associated with or originating from a bot) or a human IP address range (e.g. associated with or originating from a user's device). In one embodiment, the IP address manager 270 may query the unknown suspect IP address ranges storage 242 to see if the IP address has been identified by the account tracer 230, the campaign event tracker 232, and the IP address tracker 234 as appearing across more than one customer account. In one embodiment, the IP address manager 270 may query the simulated phishing campaign manager 250 to determine which accounts of the plurality of accounts have events associated with the same IP address. In one embodiment, the IP address manager 270 may query the campaign statistics manager 255 to determine if the IP address has been associated with events associated with users that are associated with more than one account.

Figure 3C:
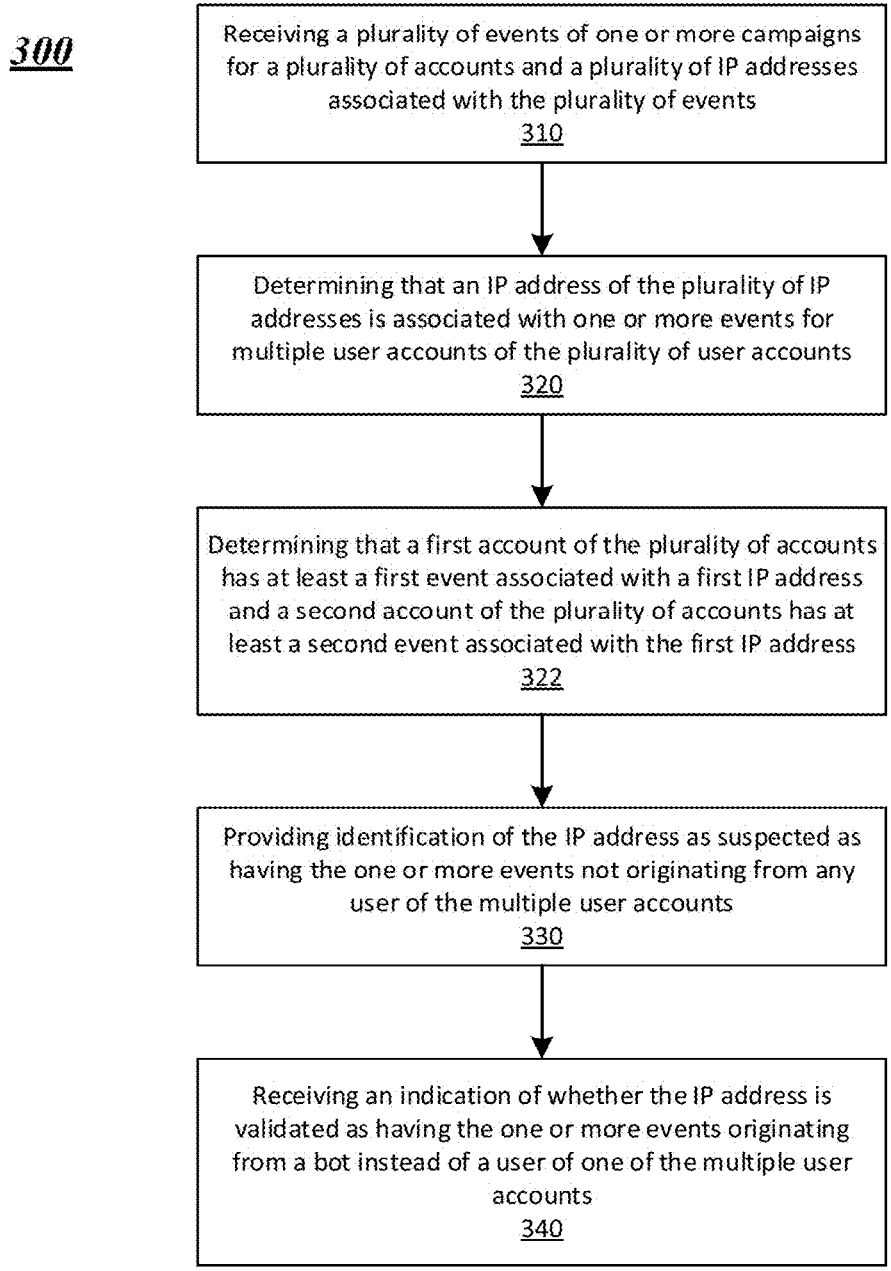
FIG. 3C depicts an implementation of a method for providing identification of an IP address as suspect wherein determining that an IP address of the plurality of IP addresses is associated with one or more events for multiple accounts of the plurality of accounts comprises determining that a first account of the plurality of accounts has at least a first event associated with a first IP address and a second account of the plurality of accounts has at least a second event associated with the first IP address.

Referring to FIG. 3C in a general overview, FIG. 3C depicts an implementation of a method 300 for determining whether an IP address is suspected as having one or more events not originating from a user. In step 310, the server receives a plurality of events of one or more campaigns for a plurality of accounts and a plurality of email addresses associated with the plurality of events. In step 320, the server determines that an IP address of the plurality of IP addresses is associated with one or more events for multiple accounts of the plurality of accounts. In step 322, the server determines that a first account of the plurality of accounts has at least a first event associated with a first IP address and a second account of the plurality of accounts has at least a second event associated with the first IP address. In step 330, the server provides identification of the IP address as suspected as having the one or more events not originating from any user of the multiple accounts. In step 340, the server receives an indication of whether the IP address is validated as having the one or more events originating from a bot instead of a user of one of the multiple accounts.

Referring to FIG. 3D in a general overview, FIG. 3D depicts an implementation of a method 300 for determining whether an IP address is suspected as having one or more events not originating from a user. In step 310, the server receives a plurality of events of one or more campaigns for a plurality of accounts and a plurality of email addresses associated with the plurality of events. In step 320, the server determines that an IP address of the plurality of IP addresses is associated with one or more events for multiple accounts of the plurality of accounts. In step 324, the server determines a number of occurrences of the IP address across multiple accounts and a number of unique accounts of the plurality of accounts for which the IP address is associated. In step 330, the server provides identification of the IP address as suspected as having the one or more events not originating from any user of the multiple accounts. In step 340, the server receives an indication of whether the IP address is validated as having the one or more events originating from a bot instead of a user of one of the multiple accounts.

In step 324, in one embodiment the IP address manager 270 searches for a single IP address across user events associated with a plurality of accounts to determine if the IP address is associated with more than one account. In one embodiment, for each IP address the IP address manager 270 maintains a count of how many times the IP address appears across events associated with any account. In one embodiment, for each IP address the IP address manager 270 maintains a count of how many accounts have one or more event which is associated with the IP address.

Referring to FIG. 3E in a general overview, FIG. 3E depicts an implementation of a method 300 for determining whether an IP address is suspected as having one or more events not originating from a user. In step 310, the server receives a plurality of events of one or more campaigns for a plurality of accounts and a plurality of email addresses associated with the plurality of events. In step 320, the server determines that an IP address of the plurality of IP addresses is associated with one or more events for multiple accounts of the plurality of accounts. In step 330, the server provides identification of the IP address as suspected as having the one or more events not originating from any user of the multiple accounts. In step 332, the server provides a user interface 271 to display identification of the IP addresses suspected as having the one or more events originating from a user of one of the multiple accounts. In step 340, the server receives an indication of whether the IP address is validated as having the one or more events originating from a bot instead of a user of one of the multiple accounts.

In step 332, in one embodiment the IP address manager 270 may provide a secure web portal that only the security awareness system administrator may access in order to display identification of the IP addresses suspected as having the one or more events originating from a user of one of the multiple accounts. In one embodiment, the IP address manager 270 causes a pop up notification to be displayed in order to alert the administrator that there is new suspected IP address information to view. In one embodiment, the IP address manager 270 may provide a user interface 271 on a mobile device, which the administrator may use to view a display of the suspect IP addresses. In one embodiment, the user interface is configured to only display the suspect IP addresses which have not been dispositioned. In one embodiment, the user interface is configured to display all of the suspect IP addresses, organized by whether or not they have been dispositioned, and if they have been dispositioned, organized by their classification.

Referring to FIG. 3F in a general overview, FIG. 3F depicts an implementation of a method 300 for determining whether an IP address is suspected as having one or more events not originating from a user. In step 310, the server receives a plurality of events of one or more campaigns for a plurality of accounts and a plurality of email addresses associated with the plurality of events. In step 320, the server determines that an IP address of the plurality of IP addresses is associated with one or more events for multiple accounts of the plurality of accounts. In step 330, the server provides identification of the IP address as suspected as having the one or more events not originating from any user of the multiple accounts. In step 334, the server provides a number of occurrences of the IP address across multiple accounts and a number of unique accounts of the plurality of accounts for which the IP address is associated. In step 340, the server receives an indication of whether the IP address is validated as having the one or more events originating from a bot instead of a user of one of the multiple accounts.

In step 334, in one embodiment the IP address manager 270 provides, via a user interface, all of the suspect IP addresses sorted from the most occurrences of the IP address across all events and all accounts to the least occurrences of the IP address across all events and all accounts. In one embodiment, the administrator, via the user interface, may click on the IP address range or on the number of occurrences of the IP address range across multiple accounts and see specific details of every IP address occurrence, including information about the user, information about the event, information about the user's platform, browser, and operating system, and information about the account associated with the user. In one embodiment, the IP address manager 270 provides a listing of all of the unique accounts of the plurality of accounts for which the IP address is associated. In one embodiment, the IP address manager 270 sorts a list of the accounts from the account with the greater occurrence of events associated with the IP address to the account with the least occurrences of events associated with the IP address. In one embodiment, the IP address manager 270 provides a matrix of all IP addresses and the number of difference accounts that had events for which the IP address was associated with.

Referring to FIG. 3G in a general overview, FIG. 3G depicts an implementation of a method 300 for determining whether an IP address is suspected as having one or more events not originating from a user. In step 310, the server receives a plurality of events of one or more campaigns for a plurality of accounts and a plurality of email addresses associated with the plurality of events. In step 320, the server determines that an IP address of the plurality of IP addresses is associated with one or more events for multiple accounts of the plurality of accounts. In step 330, the server provides identification of the IP address as suspected as having the one or more events not originating from any user of the multiple accounts. In step 342, the server receives via a user interface an indication of that the IP address is from a bot instead of a user of one of the multiple accounts.

Referring to FIG. 3H in a general overview, FIG. 3H depicts an implementation of a method 300 for determining whether an IP address is suspected as having one or more events not originating from a user and receiving specification of a rule for the IP address. In step 310, the server receives a plurality of events of one or more campaigns for a plurality of accounts and a plurality of email addresses associated with the plurality of events. In step 320, the server determines that an IP address of the plurality of IP addresses is associated with one or more events for multiple accounts of the plurality of accounts. In step 330, the server provides identification of the IP address as suspected as having the one or more events not originating from any user of the multiple accounts. In step 340, the server receives an indication of whether the IP address is validated as having the one or more events originating from a bot instead of a user of one of the multiple accounts. In step 350, the server receives specification of a rule identifying whether the IP address is validated as a bot or a user and automatically determining whether the rule overlaps with any other rules.

In step 350, in one embodiment the security awareness system administrator creates the rule using a user interface 271. In one embodiment, the administrator creates a rule by merging the IP address with other adjacent or overlapping IP addresses that have been dispositioned and classified as bots or humans. In one embodiment, when the IP address rule manager 278 receives the rule, the IP address rule manager 278 compares the IP address range of the rule with the IP address range of any existing rules and determines if there is any overlap. In one embodiment, if the IP address rule manager 278 does not find an overlap between the rule and any existing rules, the IP address rule manager 278 stores the rule in memory. In one embodiment, if the IP address rule manager 278 does find an overlap between the rule and another existing rule, the IP address manager 278 checks so see if the classifications of the overlapping rules are the same (i.e. both are classified as bot or both are classified as human). In one embodiment, if the classifications of the overlapping rules are the same, then the IP address rule manager 278 merges the two rules into one rule. In one embodiment, if the classifications of the overlapping rules are different, then the IP address rule manager 278 prompts the administrator via the user interface 271 that further dispositioning of the IP address ranges of the overlapping rules is required.

Figure 4:
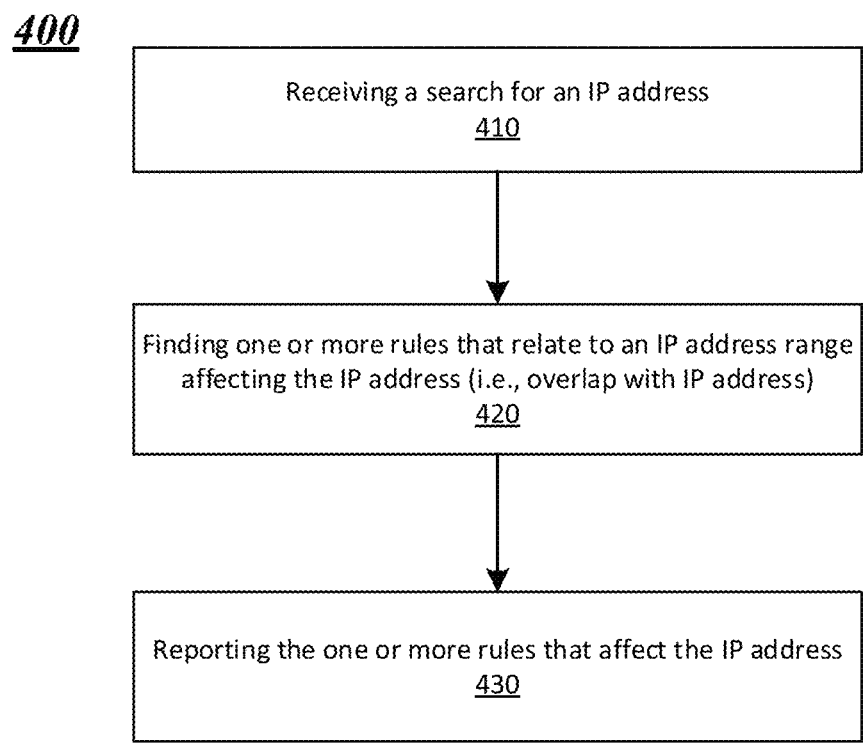
FIG. 4 depicts an implementation of a method wherein a server receives a search for an IP address, further comprising finding one or more rules that relate to an IP address range affecting the IP address, and reporting the one or more rules that affect the IP address.

Referring to FIG. 4, in a general overview, FIG. 4 depicts an implementation of a method 400 for searching for rules that impact IP addresses. In step 410, the IP address rule manager 278 which is part of the server 106 receives a search for an IP address. In one embodiment, the search is received from an administrator of a security awareness system via a user interface 271. In one embodiment, the search encompasses a range of IP addresses. In step 420, the IP address rule manager 278 finds one or more rules that relate to an IP address range that affects the IP address of the search. In one embodiment, the search encompasses IP address ranges that include the IP address of the search. In one embodiment, the search encompasses IP address ranges that are adjacent or in proximity of the IP address of the search, without including the IP address of the search. In step 430, the IP address rule manager 278 reports the one of more rules that affect the IP address. In one embodiment, the IP address rule manager 278 reports the rules via a user interface 271. In one embodiment, the IP address rule manager 278 reports the rules in order of relevance.

Figure 5:
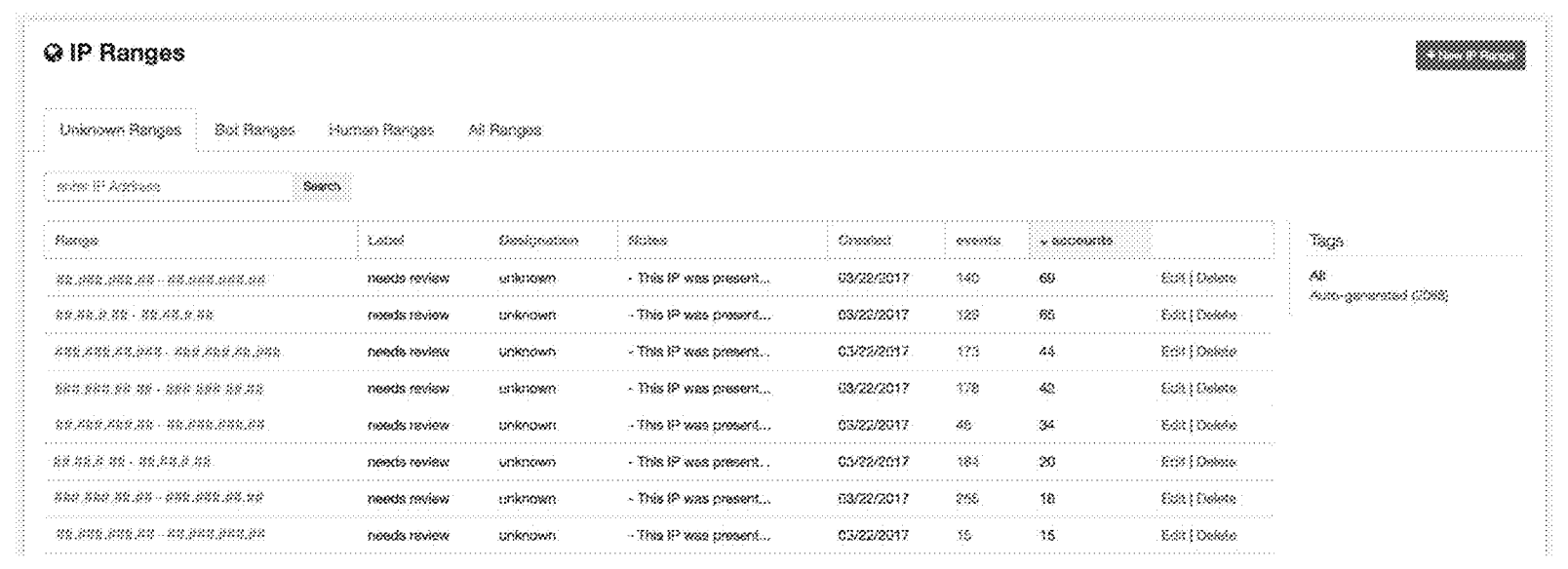

FIG. 5 depicts an illustration showing an example of how to display IP address ranges generated by the present invention. The illustration shows IP address ranges sorted across tabs, including a tab for unknown ranges, a tab for bot ranges, a tab for human ranges, and a tab for all ranges. The illustration also shows a search box, where a security awareness system administrator may search for an IP address in IP address range storage 240. The illustration shows an area where the tags associated with the IP address ranges are listed, along with the number of IP address ranges. In this example, the IP address ranges shown are tagged as "auto-generated" and there are 2068 IP address ranges found. The illustration shows a label for each IP address range. For the unknown IP address ranges in the figure, the label is "needs review". In addition, there is a notes field, which has been auto-populated in this example by the server when then IP addresses where identified as suspect. The illustration shows a field where the date the record was created is noted. The illustration further shows the number of events that have been found which are associated with that IP address, and the number of unique accounts that one or more of the events is associated with. There are options to edit or delete each listed range, as well as an option to manually add a new IP range. The data in the table can be filtered by any of the data columns shown. In the sample figure shown in FIG. 5, the data is sorted by the number of accounts that one or more of the events associated with a given IP address range are associated with.

FIG. 6 depicts an illustration of a detailed examination of an IP address range. The sample of the screen in FIG. 6 can be obtained by clicking on a specific IP address range in the IP address range column shown in FIG. 5. The range details are given in the top left corner, and the label of the range (in this example, "needs review" is given below the range details. This screen shows details of each event that is associated with that specific IP address range. For each event, the IP address management application 274 lists the user email, the user ID (unique user ID in the security awareness system), the date and time that the email was opened, and the date and time that the email was clicked on. In some embodiments, the IP range detail screen can show the attachment that was associated with the email, or give details on the macro that was associated with the email, or show the date that the event was entered. In some embodiments, the screen may display a user agent, a user platform, a user browser, or a user operating system. The screen also displays the account that the user is associated with.

Figure 7:
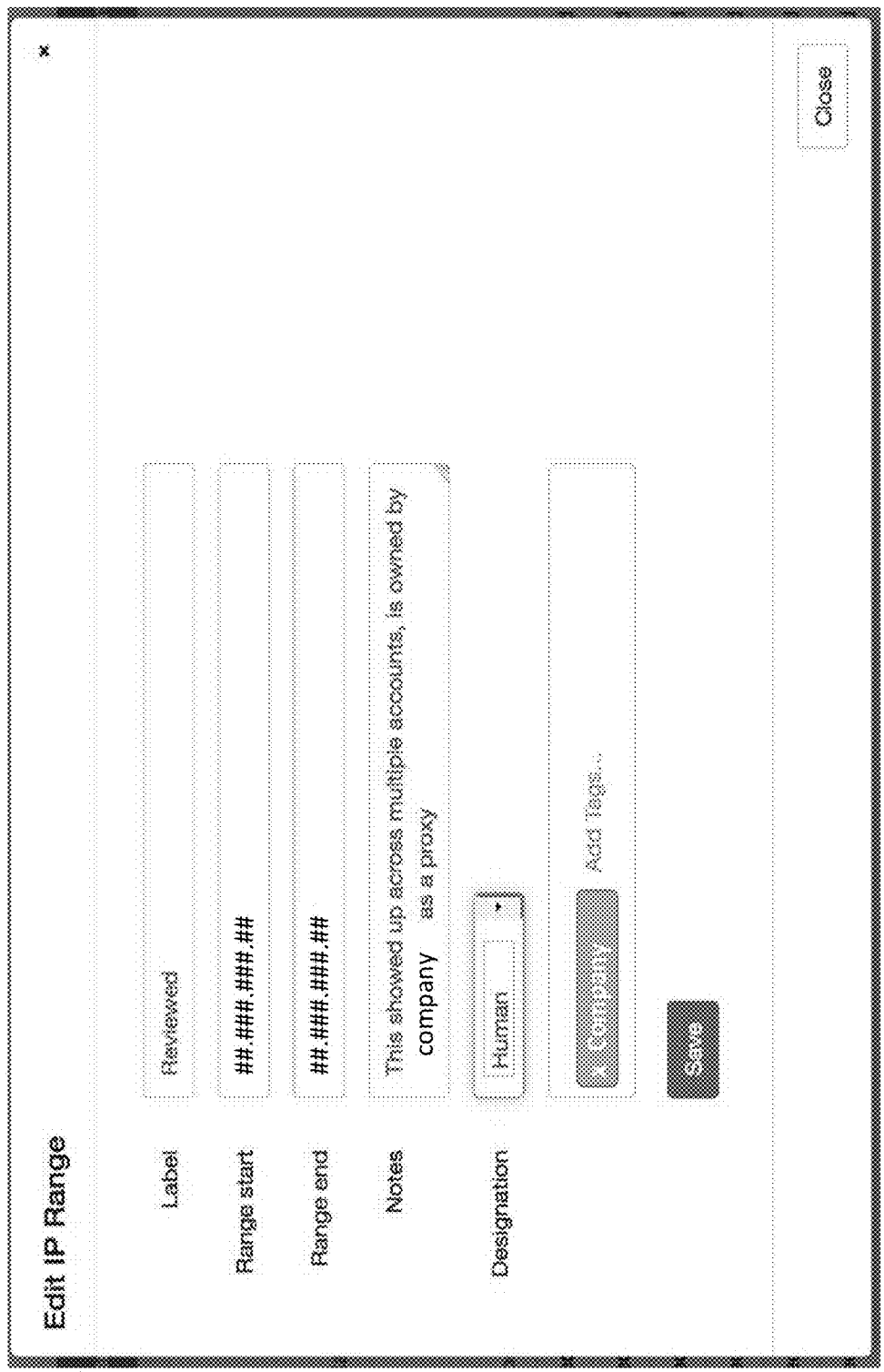
FIG. 7 is an illustration of a user interface enabling an administrator of a security awareness system to edit and disposition an IP address range.

FIG. 7 depicts an illustration of a user interface that can be used to edit an IP address range. In one embodiment, an "Edit IP Range" screen is presented when the user clicks on edit next to an IP range in the list of IP ranges. In one embodiment, the Edit IP Range screen allows the security awareness system administrator to edit the start and the end of the IP address range. In one embodiment, the Edit IP Range screen allows the user to assign a label to the IP address range, and to assign a designation to the IP address range. In one embodiment, the designation that the administrator may choose is presented as a pull-down menu with selection options for human or bot. In one embodiment, the screen allows the user to add tags to the IP address range. In one embodiment, the tags can be entered in free text. In one embodiment, the administrator is presented with a list of potential tags that may be selected from. The administrator may save the edits for the range or may close and exit the screen without saving changes.

Figure 8:
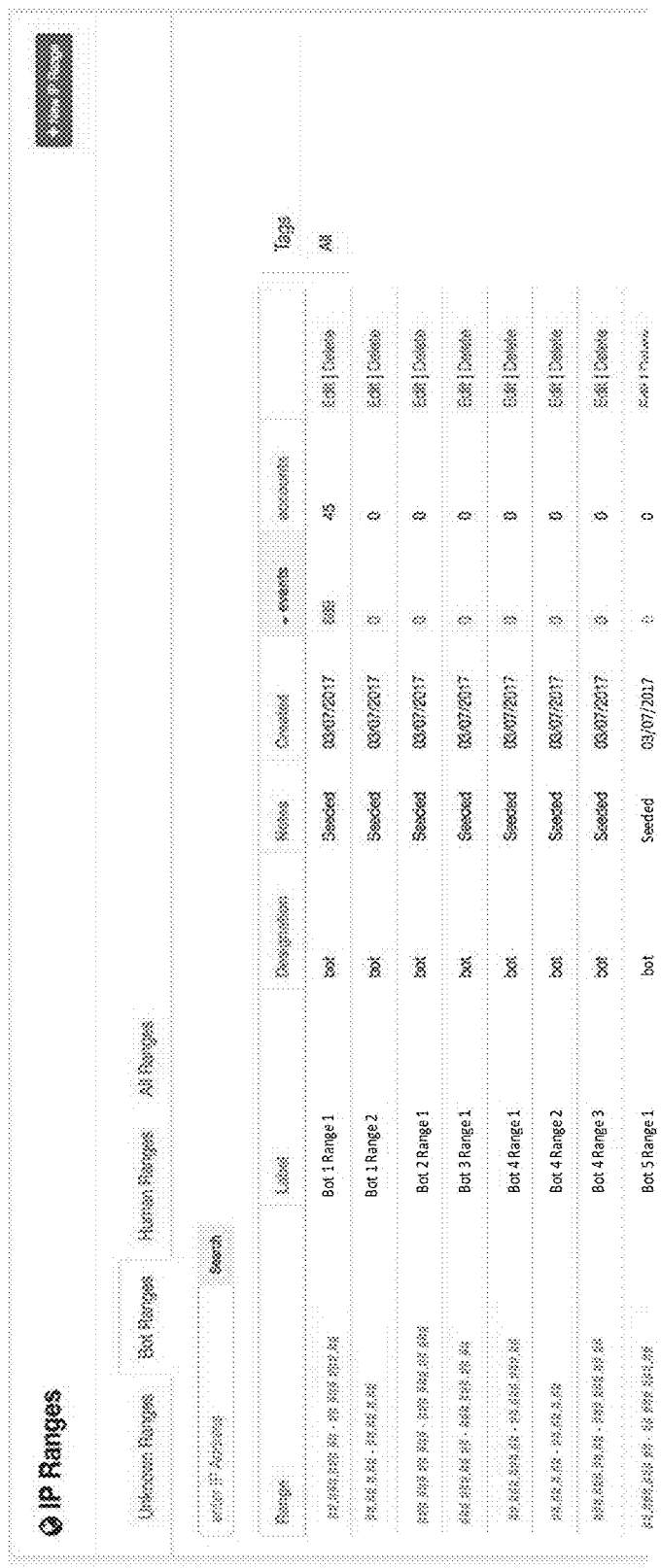

FIG. 8 depicts an illustration of an IP address ranges screen showing IP address ranges that have been designated as bots. This screen further depicts IP address ranges which have been manually added into the system, which is determined based on the notes field which indicates that the IP address ranges are "seeded" rather that automatically generated by the system.

Figure 9:
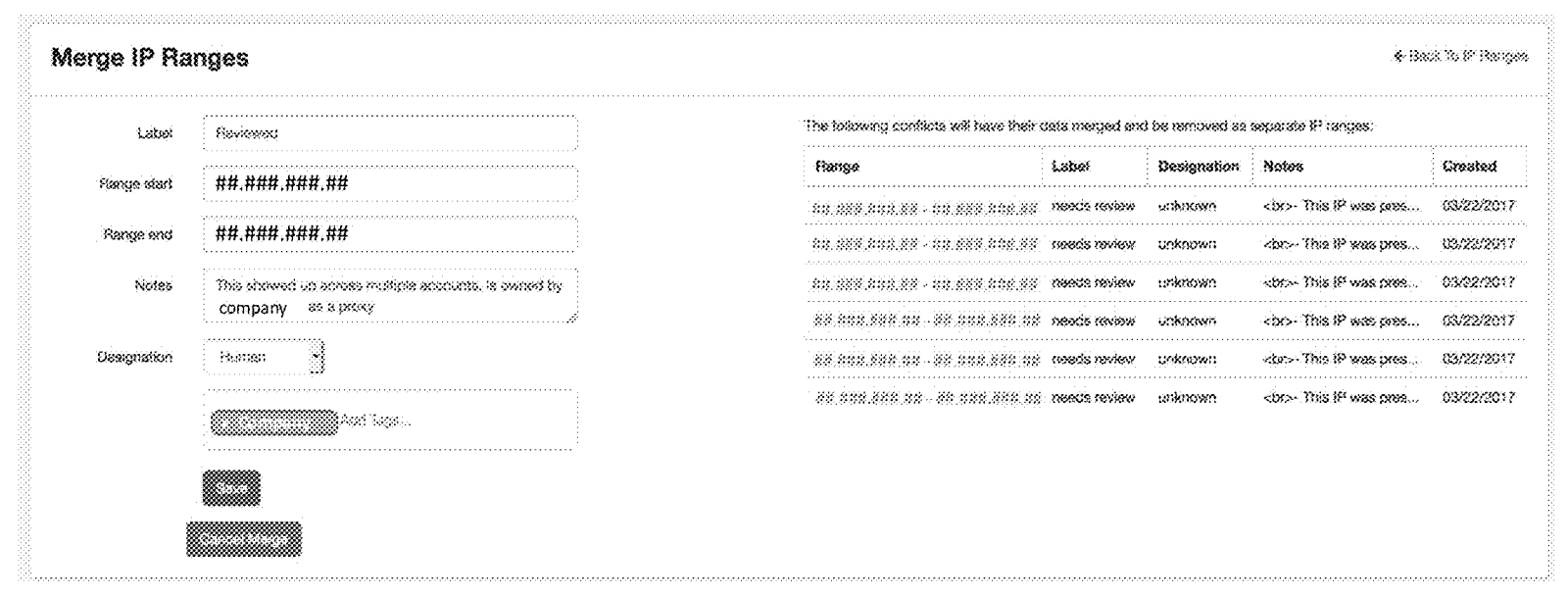

FIG. 9 depicts an illustration of an IP address range editing screen that allows an administrator to merge more than one IP address range into a single IP address range. In one embodiment, the administrator may use the merge IP ranges functionality when there is overlap between existing IP address ranges.

Figure 10:
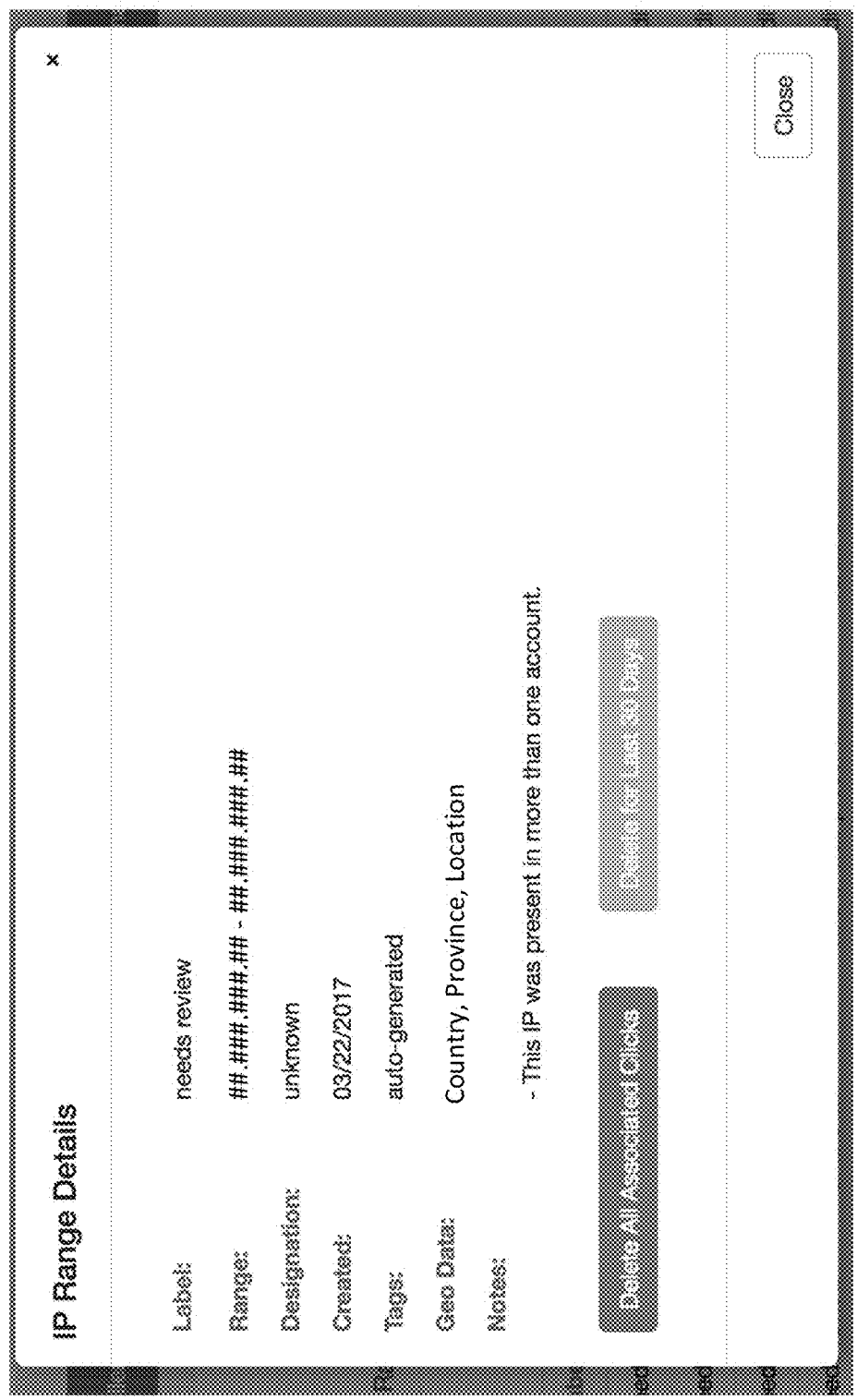
FIG. 10 is an illustration of a user interface enabling an administrator of a security awareness system to update the system statics for users where the events are associated with an IP address range.

FIG. 10 depicts an illustration of a user interface that can be used by a security awareness system administrator to create a rule associated with an IP address range. The illustration shows the IP address range details given. In one embodiment, the administrator can choose to delete all associated clicks for the given IP address range. In one embodiment, the administrator can choose to delete associated clicks for the given IP address range which are in records from the last 30 days. The IP address user statistics modifier 276 takes the administrator input and with the campaign statistics manager 255 updates the campaign statistics to remove the expunges clicks.

While various embodiments of the methods and systems have been described, these embodiments are exemplary and in no way do they limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method for validating internet protocol addresses as having events originating from a user associated with an account, the method comprising
    (a) receiving, by a server, a plurality of events comprising clicks of users on one or more links of one or more campaigns for a plurality of accounts and a plurality of internet protocol (IP) addresses of devices of the users clicking on the one or more links;
    (b) determining, by the server, that an IP address of the plurality of IP addresses is associated with one or more events for multiple accounts of the plurality of accounts;
    (c) providing, by the server based on at least the determination, identification of the IP address as suspected as having the one or more events not originating from any user of the multiple accounts; and
    (d) receiving, by the server, an indication of whether the IP address is validated as having the one or more events originating from a bot instead of any user of one of the multiple accounts.

2. The method of claim 1, wherein (a) further comprises receiving, by the server, the plurality of events comprising automatic clicks on one or more links of one or more campaigns from at least one of a network device or a software, and IP addresses of the at least one of the network device or the software.

3. The method of claim 1, wherein (b) further comprises performing, by the server, one or more queries on a database comprising the plurality of events to determine which accounts of the plurality of accounts have events associated with the same IP address.

4. The method of claim 1, wherein (b) further comprises determining, by the server, that a first account of the plurality of accounts has at least a first event associated with a first IP address and that a second account of the plurality of accounts has at least a second event associated with the first IP address.

5. The method of claim 1, wherein (b) further comprises determining, by the server, a number of occurrences of the IP address across multiple accounts and a number of unique accounts of the plurality of accounts for which the IP address is associated.

6. The method of claim 1, wherein (c) further comprises providing, by the server, a user interface to display identification of the IP addresses suspected as having the one or more events originating from a user of one of the multiple accounts.

7. The method of claim 1, wherein (c) further comprises providing, by the server, a number of occurrences of the IP address across multiple accounts and a number of unique accounts of the plurality of accounts for which the IP address is associated.

8. The method of claim 1, wherein (d) further comprises receiving, by the server, via a user interface the indication that the IP address is from a bot instead of a user of one of the multiple accounts.

9. The method of claim 1, further comprising receiving, by the server, specification of a rule identifying whether the IP address is validated as a bot or a user and automatically determining, by the server, whether the rule overlaps with any other rules.

10. A system for validating internet protocol addresses as having events originating from a user associated with an account, the system comprising
    a server comprising one or more processors, coupled to non-transitory memory, and configured to:
    receive a plurality of events comprising clicks of users on one or more links of one or more campaigns for a plurality of accounts and a plurality of internet protocol (IP) addresses of devices of the users clicking on the one or more links;
    determine that an IP address of the plurality of IP addresses is associated with one or more events for multiple accounts of the plurality of accounts;
    provide identification, based on at least the determination, of the IP addresses suspected as having the one or more events not originating from any user of the multiple accounts; and
    receive an indication of whether the IP address is validated as having the one or more events originating from a bot instead of any user of one of the multiple accounts.

11. The system of claim 10, wherein the plurality of events comprises automatic clicks on one or more links of one or more campaigns from at least one of a network device or a software, and IP addresses of the at least one of the network device or the software.

12. The system of claim 10, wherein the server is further configured to perform one or more queries on a database comprising the plurality of events to determine which accounts of the plurality of accounts have events associated with the same IP address.

13. The system of claim 10, wherein the server is further configured to determine that a first account of the plurality of accounts has at least a first event associated with a first IP address and that a second account of the plurality of accounts has at least a second event associated with the first IP address.

14. The system of claim 10, wherein the server is further configured to determine a number of occurrences of the IP address across multiple accounts and a number of unique accounts of the plurality of accounts for which the IP address is associated.

15. The system of claim 10, wherein the server is further configured to provide a user interface to display identification of the IP addresses suspected as having the one or more events originating from a user of one of the multiple accounts.

16. The system of claim 10, wherein the server is further configured to provide a number of occurrences of the IP address across multiple accounts and a number of unique accounts of the plurality of user accounts for which the IP address is associated.

17. The system of claim 10, wherein the server is further configured to receive via a user interface the indication that the IP address is from the user of one of the multiple accounts.

18. The system of claim 10, wherein the server is further configured to establish a rule identifying whether the IP address is validated as a bot or a user and automatically determine whether the rule overlaps with any other rules.

* * * * *